(12) United States Patent
Shiro et al.

(10) Patent No.: US 9,706,164 B2
(45) Date of Patent: Jul. 11, 2017

(54) COMMUNICATION MANAGEMENT SYSTEM, COMMUNICATION TERMINAL, COMMUNICATION SYSTEM, COMMUNICATION CONTROL METHOD, AND RECORDING MEDIUM

(71) Applicants: Hideki Shiro, Kanagawa (JP); Takahiro Asai, Kanagawa (JP); Yohei Yamamoto, Tokyo (JP); Atsushi Nakafuji, Tokyo (JP); Shogo Hyakutake, Tokyo (JP)

(72) Inventors: Hideki Shiro, Kanagawa (JP); Takahiro Asai, Kanagawa (JP); Yohei Yamamoto, Tokyo (JP); Atsushi Nakafuji, Tokyo (JP); Shogo Hyakutake, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/080,833

(22) Filed: Mar. 25, 2016

(65) Prior Publication Data

US 2016/0295163 A1  Oct. 6, 2016

(30) Foreign Application Priority Data

Mar. 31, 2015 (JP) .................................. 2015-072644
Mar. 10, 2016 (JP) .................................. 2016-047345

(51) Int. Cl.
*H04N 7/14* (2006.01)
*H04L 12/18* (2006.01)
(Continued)

(52) U.S. Cl.
CPC ......... *H04N 7/147* (2013.01); *H04L 12/1822* (2013.01); *H04L 65/1069* (2013.01);
(Continued)

(58) Field of Classification Search
CPC ............. H04N 7/15; H04N 7/152; H04N 7/14
(Continued)

(56) References Cited

U.S. PATENT DOCUMENTS 8,970,660 B1 * 3/2015 Rudkowski ......... H04L 65/1076
348/14.09
9,094,520 B2 * 7/2015 Vadlakonda ............ H04M 3/56
(Continued)

FOREIGN PATENT DOCUMENTS

| EP | 2 822 254 A1 | 1/2015 |
|---|---|---|
| JP | 2003-101981 | 4/2003 |
| JP | 2012-178135 | 9/2012 |

OTHER PUBLICATIONS

Extended European Search Report issued Aug. 10, 2016 in Patent Application No. 16163318.5.

*Primary Examiner* — Melur Ramakrishnaiah
(74) *Attorney, Agent, or Firm* — Oblon, McClelland, Maier & Neustadt, L.L.P.

(57) ABSTRACT

A communication management system manages group information regarding one or more groups of a plurality of communication terminals, while the plurality of communication terminals are communicating in the same communication session. In response to a request from one communication terminal, the communication management system updates the group information to reflect the currently-established groups, and transmits updated group information to all of the plurality of communication terminals communicating in the same communication session.

11 Claims, 25 Drawing Sheets

(51) Int. Cl.
*H04L 29/06* (2006.01)
*H04N 7/15* (2006.01)

(52) U.S. Cl.
CPC ........ *H04L 65/1093* (2013.01); *H04L 65/403* (2013.01); *H04N 7/155* (2013.01)

(58) Field of Classification Search
USPC .......................................... 348/14.01–14.16
See application file for complete search history.

(56) References Cited

U.S. PATENT DOCUMENTS

| | | |
|---|---|---|
| 2004/0082352 A1 | 4/2004 | Keating et al. |
| 2006/0164508 A1* | 7/2006 | Eshkoli ................. H04N 7/147 348/14.09 |
| 2006/0211411 A1 | 9/2006 | Haaramo et al. |
| 2008/0096597 A1 | 4/2008 | Vempati et al. |
| 2011/0044436 A1* | 2/2011 | Tam ................ H04M 1/274558 379/88.19 |
| 2011/0305332 A1* | 12/2011 | Geppert .............. H04L 12/1822 379/202.01 |
| 2015/0006697 A1 | 1/2015 | Aono et al. |

* cited by examiner

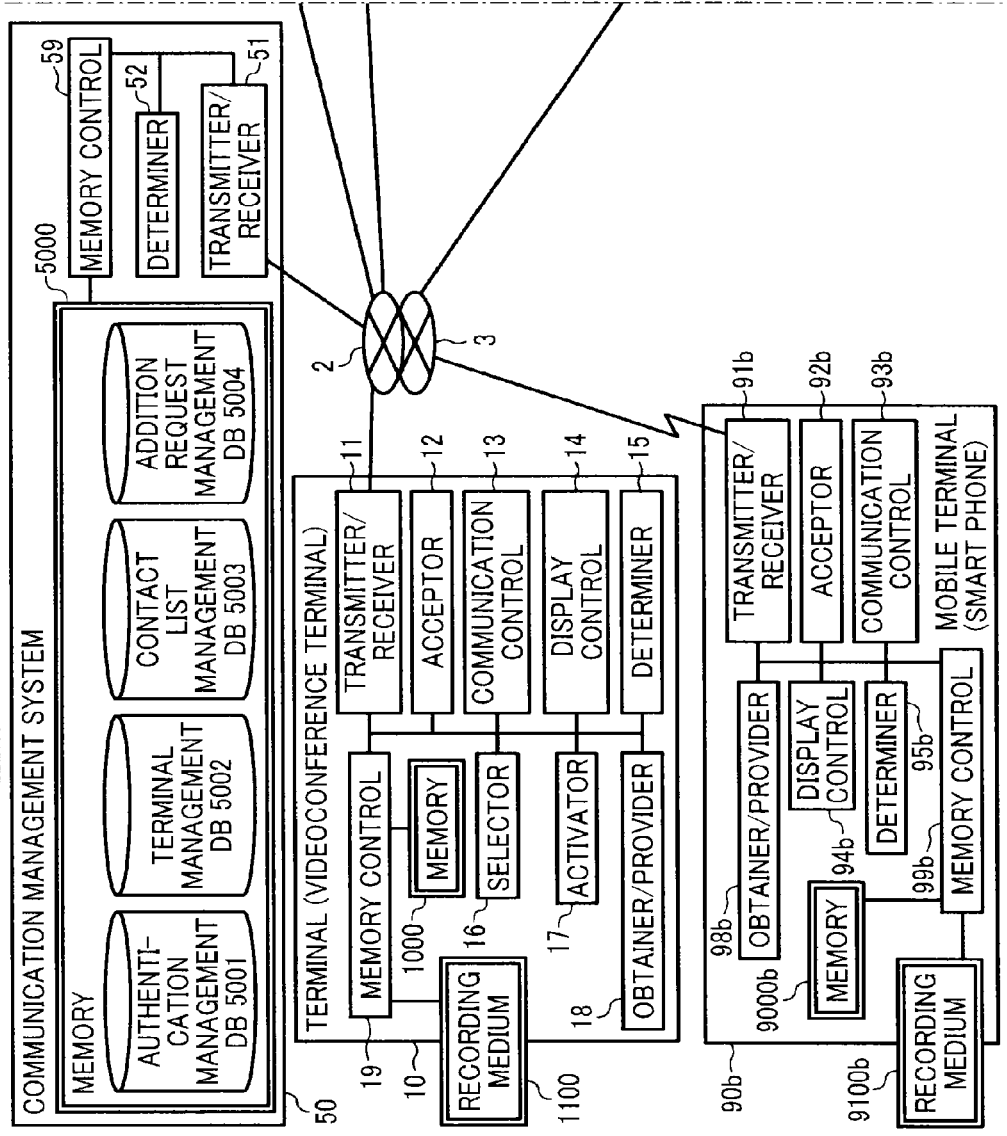

FIG. 8

| DATA ID | IP ADDRESS |
|---------|------------|
| s1d1    | 1.2.1.3    |
| s1d2    | 1.2.2.3    |
| s1d3    | 1.3.1.4    |
| s1d4    | 1.3.2.4    |
| s2d1    | 1.2.1.4    |
| ...     | ...        |

FIG. 9

AUTHENTICATION MANAGEMENT TABLE

| TERMINAL ID | PASSWORD |
|-------------|----------|
| 01aa        | aaaa     |
| 01ab        | abab     |
| 01ba        | baba     |
| ...         | ...      |

FIG. 10

TERMINAL MANAGEMENT TABLE

| TERMINAL ID | COUNTERPART TERMINAL NAME | OPERATING STATE | DATE/TIME RECEIVED | IP ADDRESS OF TERMINAL |
|---|---|---|---|---|
| 01aa | AA TERMINAL, TOKYO OFFICE, JAPAN | ONLINE (COMMUNICATION OK) | 2014.4.10.13:40 | 1.2.1.3 |
| 01ab | AB TERMINAL, OSAKA OFFICE, JAPAN | ONLINE (COMMUNICATION OK) | 2014.4.09.12:00 | 1.2.1.4 |
| ... | ... | ... | ... | ... |
| 01ba | BA TERMINAL, BEIJING OFFICE, CHINA | OFFLINE | 2014.4.10.13:45 | 1.2.2.3 |
| 07bb | BB TERMINAL, SHANGHAI OFFICE, CHINA | ONLINE (INTERRUPTED) | 2014.4.10.13:50 | 1.2.2.4 |
| ... | ... | ... | ... | ... |
| 01ca | CA TERMINAL, WASHINGTON D.C. OFFICE, U.S. | OFFLINE | 2014.4.10.12:45 | 1.3.1.3 |
| 01cb | CB TERMINAL, NEW YORK OFFICE, U.S. | ONLINE (COMMUNICATING) | 2014.4.10.13:55 | 1.3.1.4 |
| ... | ... | ... | ... | ... |
| 01da | DA TERMINAL, BERLIN OFFICE, EUROPE | ONLINE (COMMUNICATING) | 2014.4.08.12:45 | 1.3.2.3 |
| 07db | DB TERMINAL, LONDON OFFICE, EUROPE | ONLINE (COMMUNICATION OK) | 2014.4.10.12:45 | 1.3.2.4 |
| ... | ... | ... | ... | ... |

FIG. 11

CONTACT LIST MANAGEMENT TABLE

| STARTING TERMINAL ID | COUNTERPART TERMINAL ID |
|---|---|
| 01aa | 01ab, ..., 01ba, 07bb, ..., 01ca, 01cb, 01da, 07db, ... |
| 01ab | 01aa, 01ca, 01cb |
| 01ba | 01ab, 01ca, 01cb, 01da, 07db |
| ... | ... |
| 07db | 01aa, 01ab, 01ba, ..., 01da, 01ca, 01cb, ..., 01da |
| ... | ... |

FIG. 12

| TERMINAL ID | GROUP ID |
|---|---|
| 01aa | g1 (GROUP G1) |
| ... | ... |
| 01ba | fr (FREE) |
| ... | ... |
| 01cb | g2 (GROUP G2) |
| ... | ... |
| 07db | br (BROADCAST) |
| ... | ... |

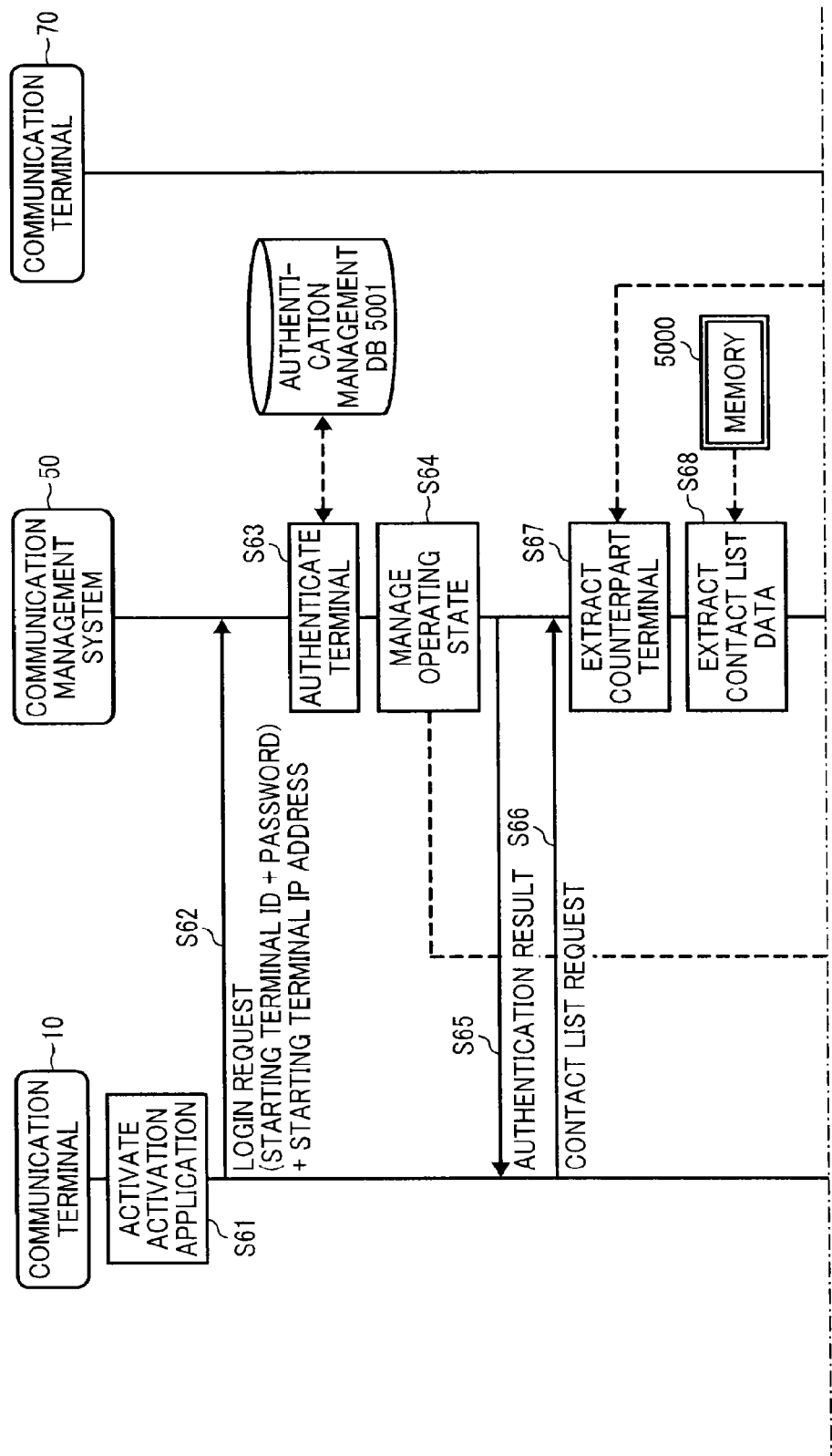

FIG. 14

| OPERATING STATE | TERMINAL ID | COUNTERPART NAME |
|---|---|---|
| 📞 | 01ab | AB TERMINAL, OSAKA OFFICE, JAPAN |
| 📞 | 01ba | BA TERMINAL, BEIJINIG OFFICE, CHINA |
| 📞 | 07db | DB TERMINAL, LONDON OFFICE, EUROPE |
| 🎧 | 01cb | CB TERMINAL, NEW YORK OFFICE, U.S. |

ADD TO CONTACT LIST

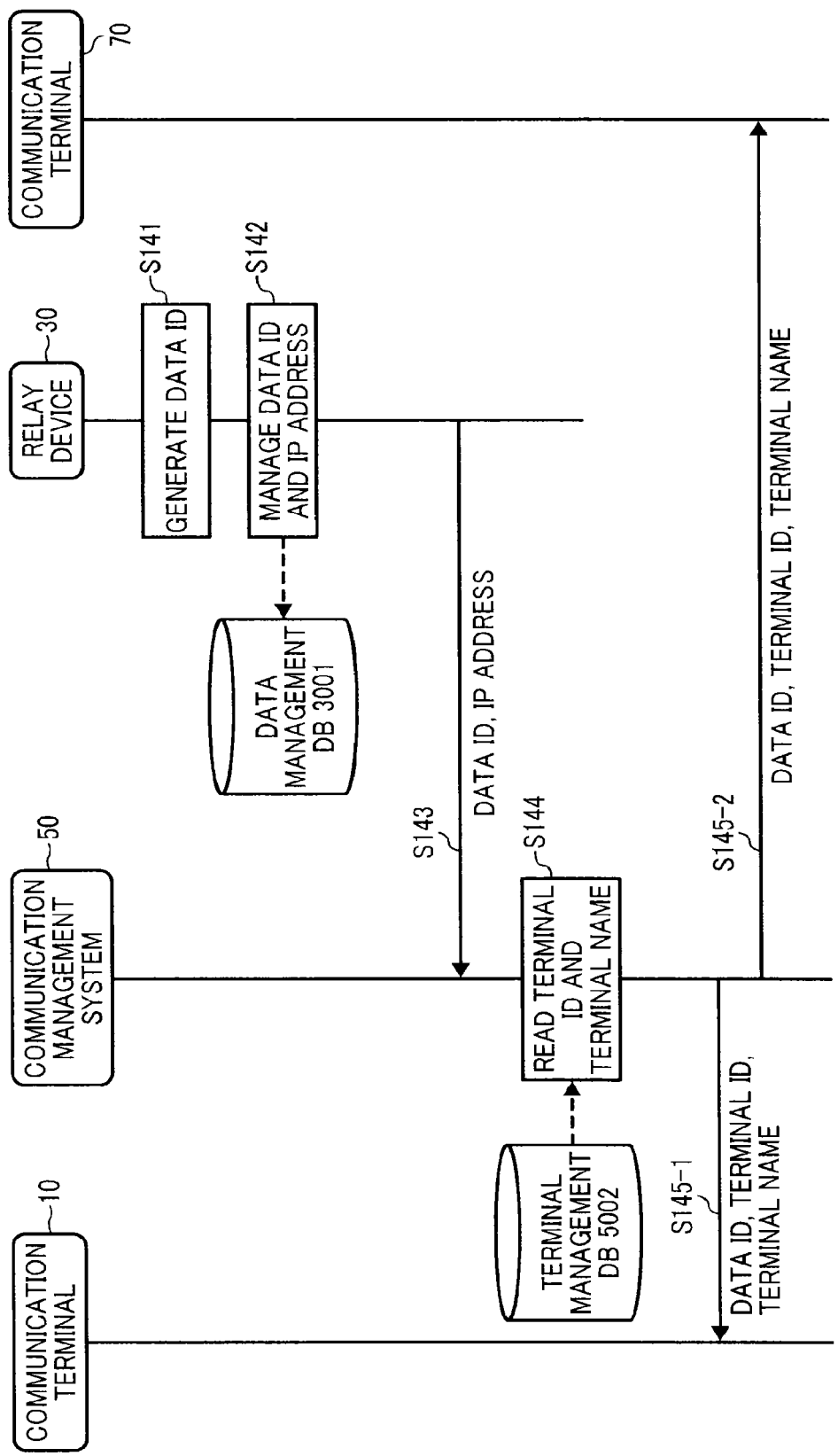

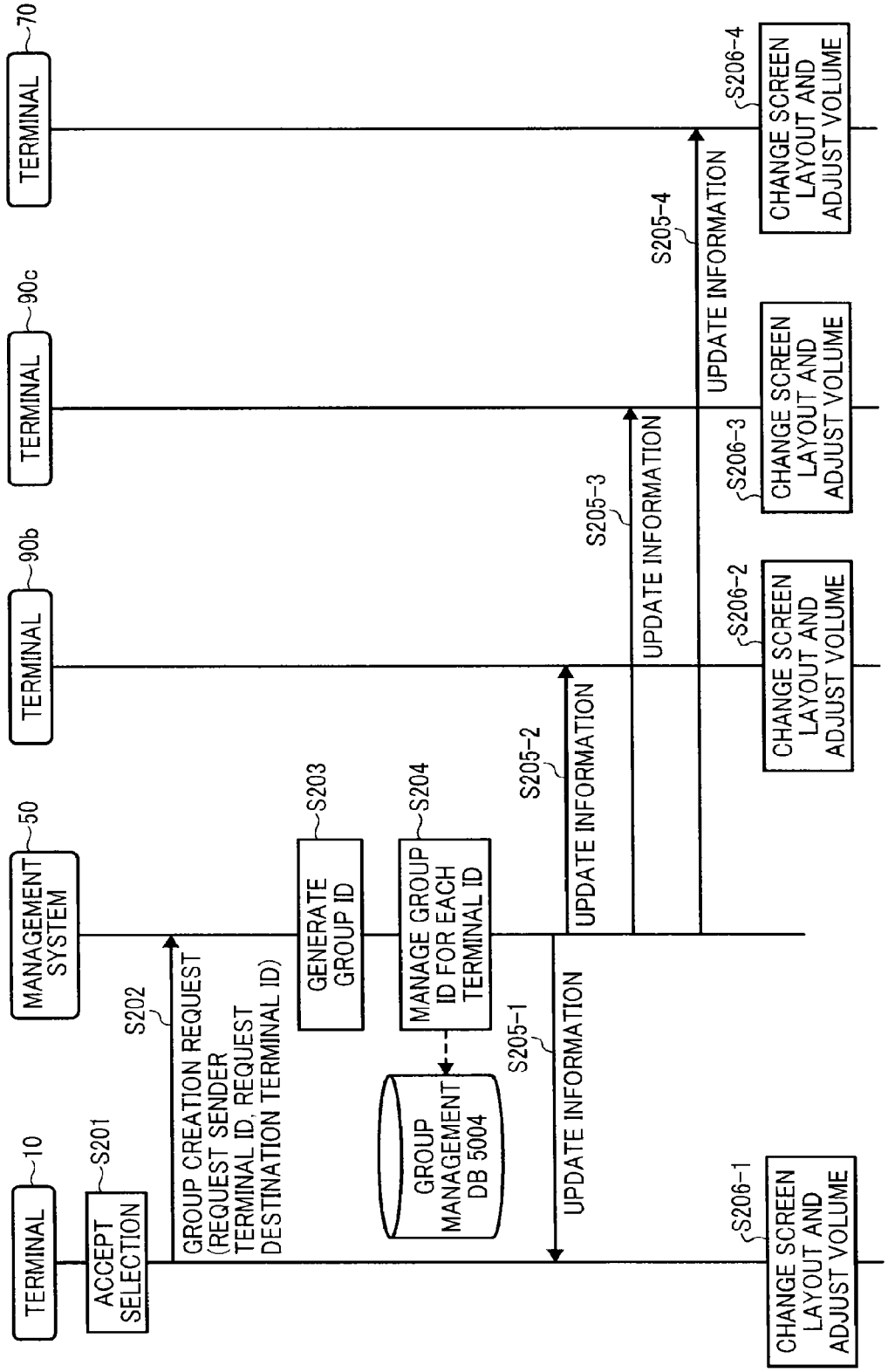

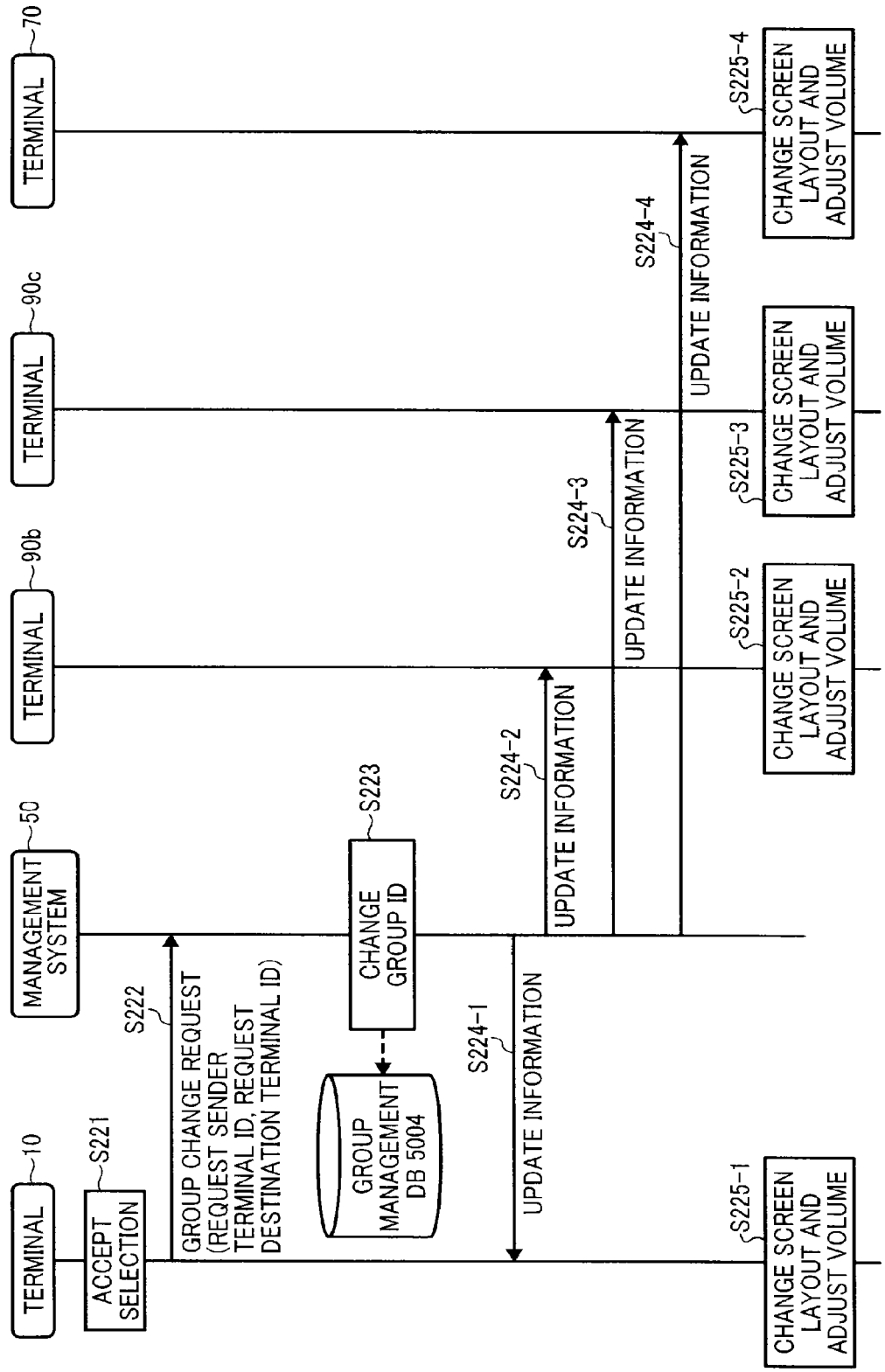

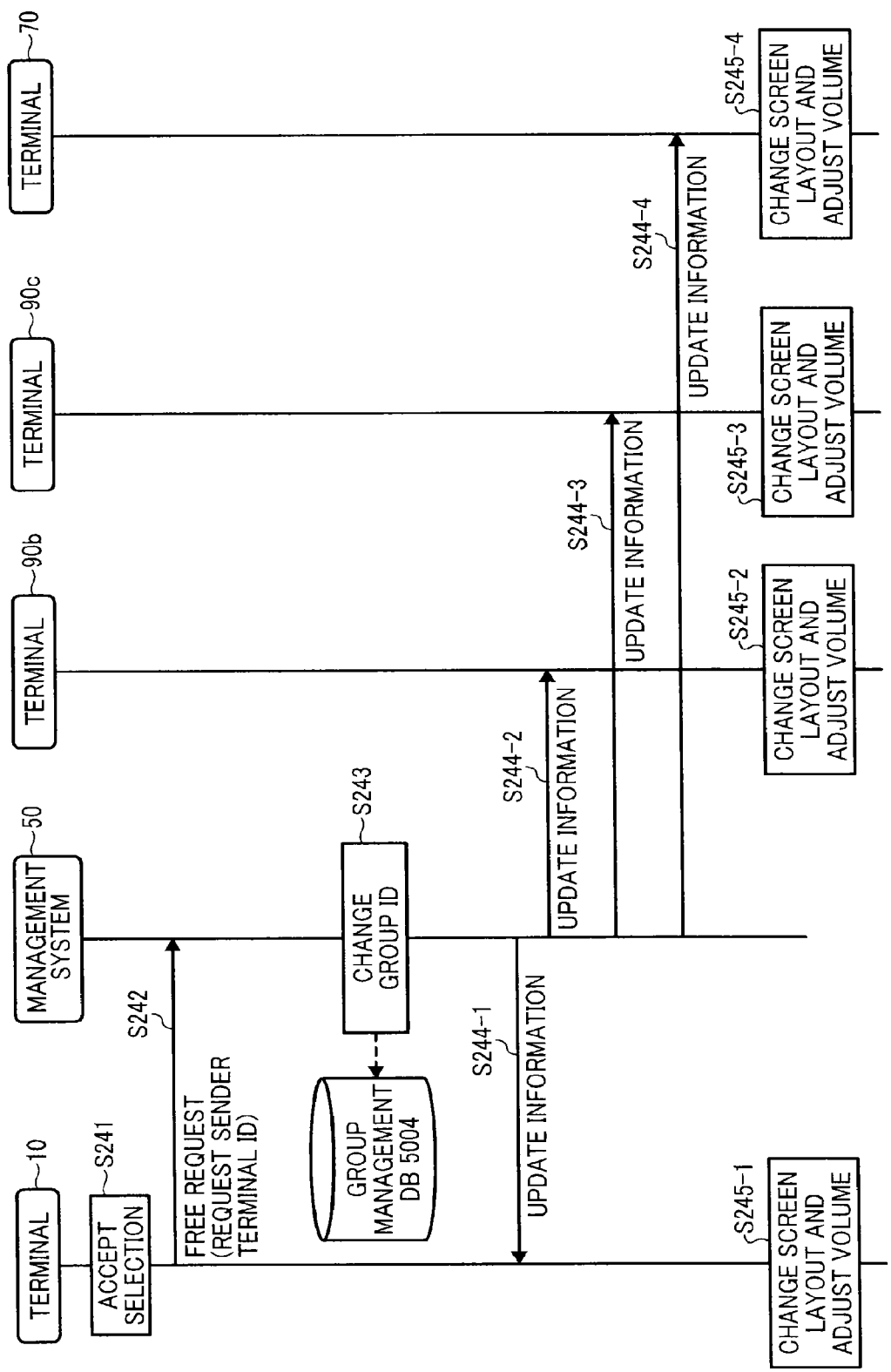

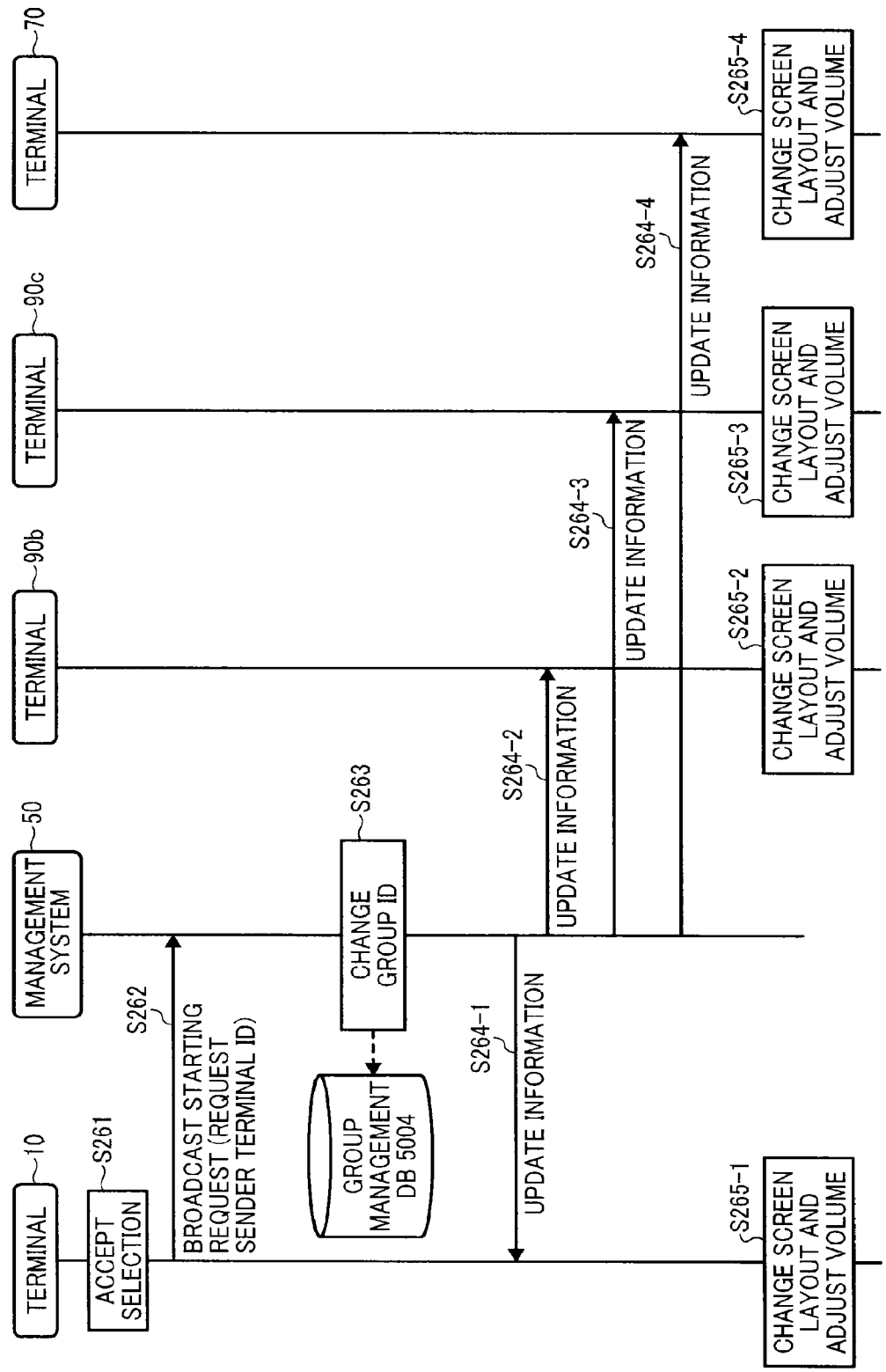

COMMUNICATION MANAGEMENT SYSTEM, COMMUNICATION TERMINAL, COMMUNICATION SYSTEM, COMMUNICATION CONTROL METHOD, AND RECORDING MEDIUM

CROSS-REFERENCE TO RELATED APPLICATIONS

This patent application is based on and claims priority pursuant to 35 U.S.C. §119(a) to Japanese Patent Application Nos. 2015-072644, filed on Mar. 31, 2015, and 2016-047345, filed on Mar. 10, 2016, in the Japan Patent Office, the entire disclosure of which is hereby incorporated by reference herein.

BACKGROUND

Technical Field

The present invention relates to a communication management system, a communication terminal, a communication system including the communication management system and the communication terminal, a communication control method, and a non-transitory recording medium storing a communication control program.

Description of the Related Art

With the increased need for reducing business trip costs and time in recent years, videoconference systems are now widely used. The videoconference systems transmit or receive image data and audio data among a plurality of communication terminals such as videoconference terminals.

In some cases, while communicating with a plurality of communication terminals in one communication session, a user at one communication terminal may want to just talk with a small group of users, out of all users having the communication session. In such case, such user needs to end the communication session to establish a new communication session with the small group of users.

SUMMARY

Example embodiments of the present invention include a communication management system, which manages group information regarding one or more groups of a plurality of communication terminals, while the plurality of communication terminals are communicating in the same communication session. In response to a request from one communication terminal, the communication management system updates the group information to reflect the currently-established groups, and transmits updated group information to all of the plurality of communication terminals communicating in the same communication session.

Example embodiments of the present invention include a communication management system to manage a plurality of communication terminals communicating in a same communication session. The communication management system receives a request for creating a first group with a second communication terminal from a first communication terminal, the group creation request including first terminal identification information identifying the first communication terminal and second terminal identification information identifying the second communication terminal, the first communication terminal and the second communication terminal each being one of the plurality of communication terminals communicating in the same communication session. The communication management system further generates first group identification information identifying the first group and stores group information in a memory, the group information associating the first group identification information with the first terminal identification information and the second terminal identification information. The communication management system transmits the group information to respective one of the plurality of communication terminals communicating in the same communication session.

Example embodiments of the present invention include a first communication terminal capable of controlling output of content data transmitted from at least a second communication terminal. The first communication terminal transmits to a communication management system, a group creation request for creating a first group with a second communication terminal, the group creation request including first terminal identification information identifying the first communication terminal and second terminal identification information identifying the second communication terminal, the first communication terminal and the second communication terminal each being one of a plurality of communication terminals communicating in the same communication session. The first communication terminal receives, from the communication management system, group information associating first group identification information identifying the first group, with the first terminal identification information and the second terminal identification information. The first communication terminal controls an output device to output content data received from the second communication terminal belonging to the first group in greater size or volume, compared to content data received from other communication terminal not belonging to the first group.

Example embodiments of the present invention include a method performed by the communication management system, a method performed by the communication terminal, a communication system including the plurality of communication terminals and the communication management system, and a non-transitory recording medium storing a control program for causing one or more processors to perform the communication control method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 7A and 7B (FIG. 7) are a schematic block diagram illustrating a functional configuration of the communication system of FIG. 1 according to an embodiment of the present invention;

FIG. 8 an illustration of an example data structure of a data management table;

FIG. 9 is an illustration of an example data structure of an authentication management table;

FIG. 10 is an illustration of an example data structure of a terminal management table;

FIG. 11 is an illustration of an example data structure of a contact list management table;

FIG. 12 is an illustration of an example data structure of a group management table;

FIGS. 13A and 13B (FIG. 13) are a data sequence diagram illustrating operation of preparing for communication between the communication terminals of the communication system of FIG. 1;

FIG. 14 is an illustration of an example contact list screen;

FIG. 16 is a data sequence diagram illustrating operation of transmitting a data ID, according to an embodiment of the present invention;

FIG. 18 is a data sequence diagram illustrating operation of generating a new group within the same session, according to an embodiment of the present invention;

FIG. 20 is a data sequence diagram illustrating operation of changing a group within the same session, according to an embodiment of the present invention;

FIG. 22 is a data sequence diagram illustrating operation of leaving from the group, according to an embodiment of the present invention;

FIG. 24 is a data sequence diagram illustrating operation of processing a broadcast request according to an embodiment of the present invention.

Figure 1:
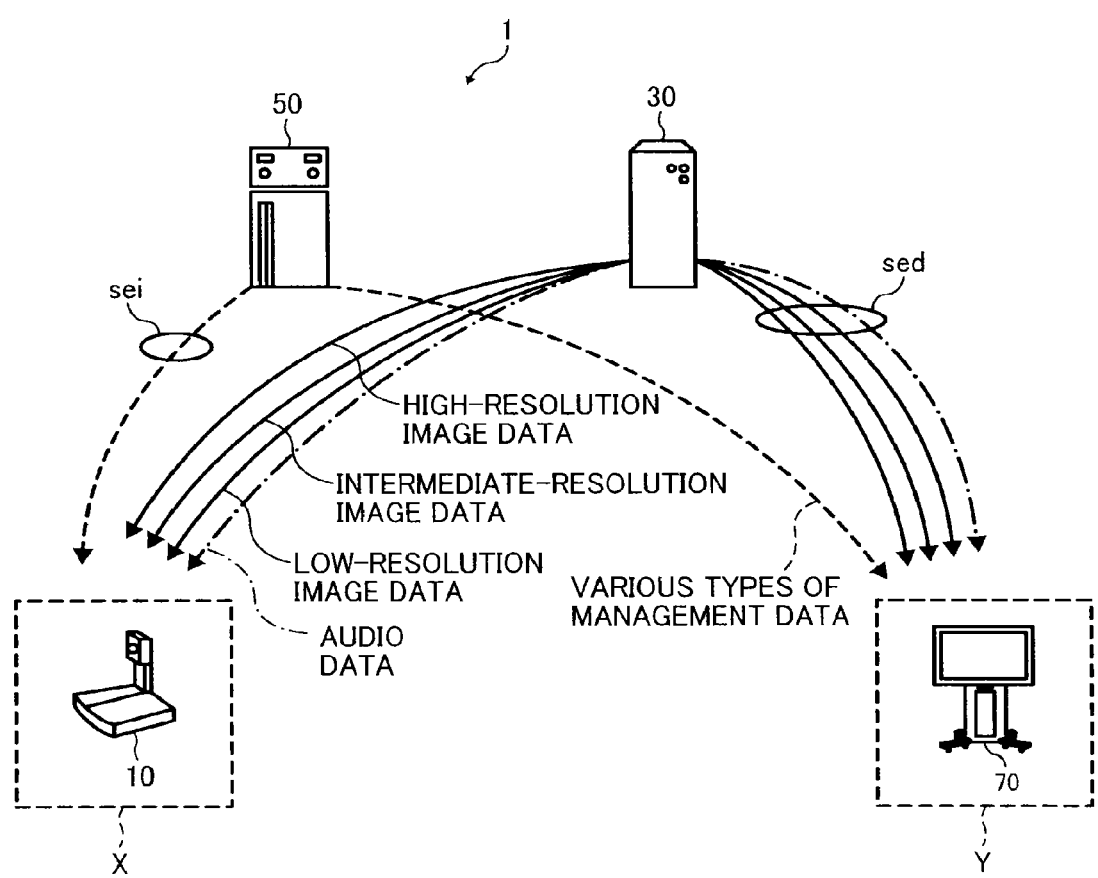
FIG. 1 is a schematic diagram illustrating a part of a communication system relating to videoconference communication, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring to the drawings, an embodiment of the present invention is described.

<Configuration of Communication System>

Referring to FIG. 1, a communication system 1 for carrying out videoconference among a plurality of communication terminals (10, 70) is described according to the embodiment. FIG. 1 is a schematic diagram illustrating a portion of the communication system 1, which relates to videoconference being carried out between the communication terminals 10 and 70.

In the following, it is assumed that the communication system 1 manages transmission of content data to carry out videoconference among the terminals. Alternatively, the communication system 1 may manage transmission of content data to carry out casual conversation among the users at different sites.

The communication system 1 includes the plurality of communication terminals (10, 70), a relay device 30, and a communication management system 50. The communication terminal transmits or receives image data and audio data as an example of content data. In FIG. 1, the communication terminal may be implemented by a videoconference terminal 10 in one example, or by en electronic whiteboard 70 in another example. The image data may be a video image or a still image, or both of the video image and the still image.

In this disclosure, the communication terminal that sends a request for starting videoconference is referred to as the "starting terminal", and the communication terminal serving as a request destination (relay destination) of videoconference is referred to as the "counterpart terminal". In FIG. 1, the communication terminal 10 is referred to as the starting terminal, and the communication terminal 70 is referred to as the counterpart terminal. Alternatively, when the communication terminal 70 requests to start videoconference with the communication terminal 10, the communication terminal 70 is referred to as the starting terminal, and the communication terminal 10 is referred to as the counterpart terminal. Note that the communication terminal may be used not only for communication between different offices or for communication between different rooms in the same office, but also for communication within the same room or for outdoor-indoor communication or outdoor-outdoor communication.

The relay device 30 relays content data among the plurality of communication terminals. The communication management system 50 centrally controls login authentication of the communication terminal, management of the communication state of the communication terminal, management of a contact list, and management of the communication state or the like of the relay device 30. The relay devices 30 and the management system 50 in the above-described embodiment may be configured by a single computer or a plurality of computers to which divided portions (functions) are arbitrarily allocated.

In the communication system 1, a management data session "sei" is established between the starting terminal 10 and the counterpart terminal 70 via the communication management system 50 to transmit or receive various management data. Between the starting terminal 10 and the counterpart terminal 70, four sessions are established via the relay device 30 to transmit or receive four items of data including high-resolution image data, intermediate-resolution image data, low-resolution image data, and audio data. In FIG. 1, these four sessions are collectively referred to as image and audio data session "sed". The image and audio data session "sed" may not always include four sessions, but any number of sessions greater than or less than four. Any communication terminal (10 or 70) may communicate with each other through directly establishing a session with each other without intervening the relay device 30.

Now, resolution of image data to be processed in this embodiment is described. The low-resolution image data serves as a base image and has horizontal 160 pixels by vertical 120 pixels. The intermediate-resolution image data has horizontal 320 pixels by vertical 240 pixels. The high-resolution image data has horizontal 640 pixels by vertical 480 pixels. In the case of a narrow band path, low-quality image data that only includes low-resolution image data serving as a base image is relayed. In the case of a relatively wide band path, intermediate-quality image data including low-resolution image data serving as a base image and intermediate-resolution image data is relayed. In the case of a very wide band path, high-quality image data including low-resolution image data serving as a base image, intermediate-resolution image data, and high-resolution image data is relayed. Since audio data is relatively small in data size, the audio data is relayed even in the case of a narrow band path.

<Hardware Configuration of Communication System>

Now, a hardware configuration of the communication system 1 is described.

<Hardware Configuration of Videoconference Terminal>

Figure 2:
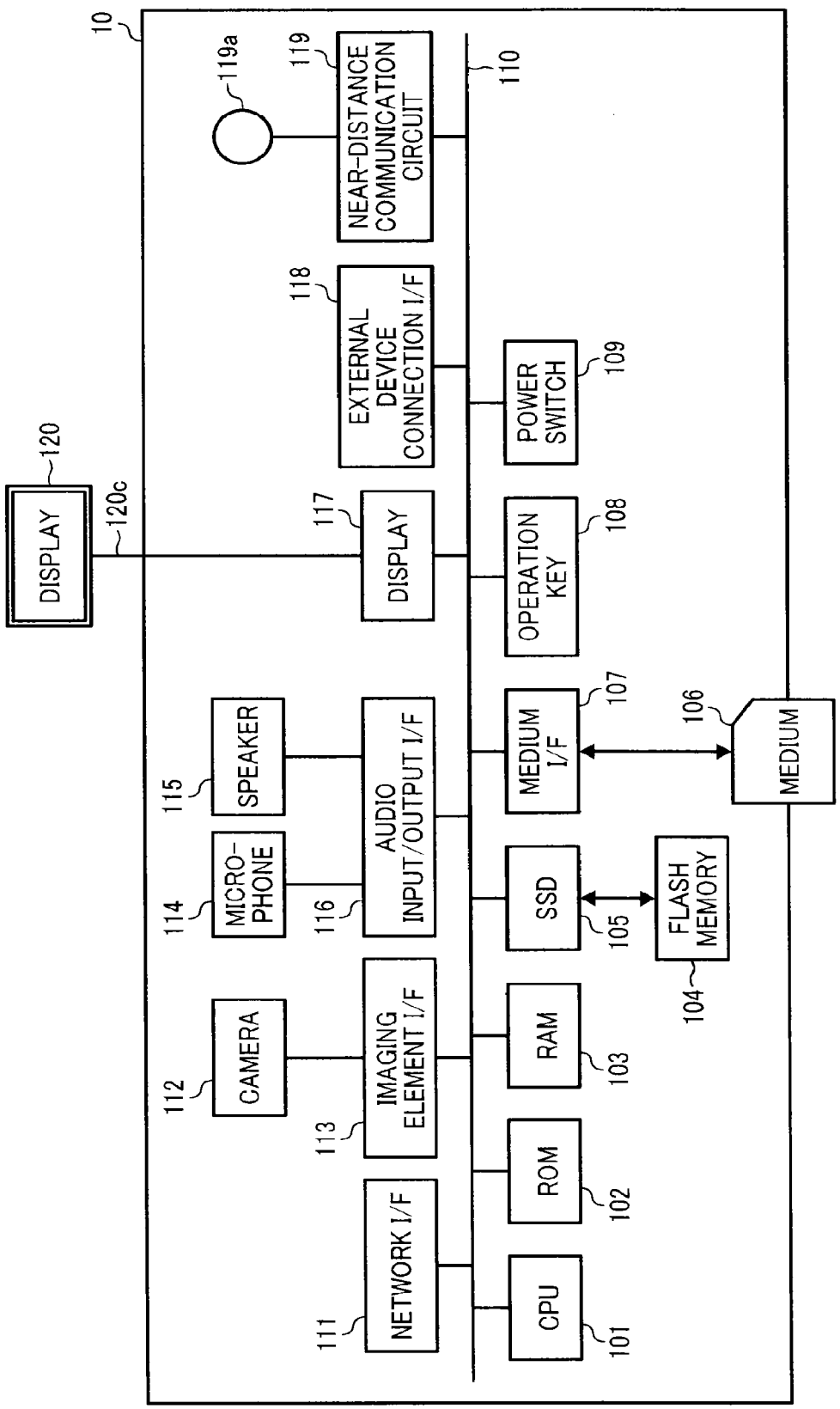
FIG. 2 is a schematic block diagram illustrating a hardware configuration of a communication terminal of the communication system of FIG. 1.

FIG. 2 illustrates a hardware configuration of the videoconference terminal according to the embodiment of the present invention. As illustrated in FIG. 2, the videoconference terminal as an example of the communication terminal includes a central processing unit (CPU) 101, a read only memory (ROM) 102, a random access memory (RAM) 103, a flash memory 104, a solid state drive (SSD) 105, a medium interface (I/F) 107, an operation key 108, a power switch 109, a bus line 110, a network I/F 111, a camera 112, an imaging device I/F 113, a microphone 114, a speaker 115, an audio input/output I/F 116, a display I/F 117, an external device connection I/F 118, a near-distance communication circuit 119, and an antenna 119a for the near-distance communication circuit 119. The CPU 101 controls entire operation of the communication terminal 10. The ROM 102 stores a control program for operating the CPU 101 such as an Initial Program Loader (IPL). The RAM 103 is used as a work area for the CPU 101. The flash memory 104 stores various data such as a communication control program, image data, and audio data. The SSD 105 controls reading or writing of various data to or from the flash memory 105 under control of the CPU 101. In alternative to the SSD, a hard disk drive (HDD) may be used. The medium I/F 107 controls reading or writing of data with respect to a recording medium 106 such as a flash memory. The operation key 108 is operated by a user to input a user instruction such as a user selection of a destination of the communication terminal 10. The power switch 109 turns on or off the power of the communication terminal 10.

The network I/F 111 allows communication of data with an external device through a communication network 2 such as the Internet. The camera 112 is an example of imaging device capable of capturing a subject under control of the CPU 101, and may be incorporated in the communication terminal. The imaging element device I/F 113 is a circuit that controls driving of the camera 112. The microphone 114 is an example of audio collecting device capable of inputting audio under control of the CPU 101, and may be incorporated in the communication terminal. The audio I/O I/F 116 is a circuit for inputting or outputting an audio signal between the microphone 114 and the speaker 115 under control of the CPU 101. The display I/F 117 is a circuit for transmitting image data to the external display 120 under control of the CPU 101. The external device connection I/F 118 is an interface circuit that connects the terminal 10 to various external devices. The near-distance communication circuit 119 is a communication circuit in compliance with a near-field communication (NFC; Registered Trademark) or Bluetooth (Registered Trademark).

The bus line 110 may be an address bus or a data bus, which electrically connects various elements such as the CPU 101 of FIG. 2.

The display 120 may be a liquid crystal or organic electroluminescence (EL) display that displays an image of a subject, an operation icon, or the like. The display 120 is connected to the display I/F 117 by the cable 120c. The cable 120c may be an analog red green blue (RGB) (video graphic array (VGA)) signal cable, a component video cable, a high-definition multimedia interface (HDMI) signal cable, or a digital video interactive (DVI) signal cable.

The camera 112 includes a lens and a solid-state imaging element that converts an image (video) of a subject to electronic data by converting light to electric charge. As the solid-state imaging element, for example, a complementary metal-oxide-semiconductor (CMOS) or a charge-coupled device (CCD) is used. The external device connection I/F 118 is capable of connecting an external device such as an external camera, an external microphone, or an external speaker through a Universal Serial Bus (USB) cable or the like. In the case where an external camera is connected, the external camera is driven in preference to the built-in camera 112 under control of the CPU 101. Similarly, in the case where an external microphone is connected or an external speaker is connected, the external microphone or the external speaker is driven in preference to the built-in microphone 114 or the built-in speaker 115 under control of the CPU 101.

The recording medium 106 is removable from the communication terminal 10. In addition, a non-volatile memory that reads or writes data under control of the CPU 101 is not limited to the flash memory 104, and an electrically erasable and programmable read-only memory (EEPROM) may be used instead.

<Hardware Configuration of Communication Management System and Relay Device>

Figure 3:
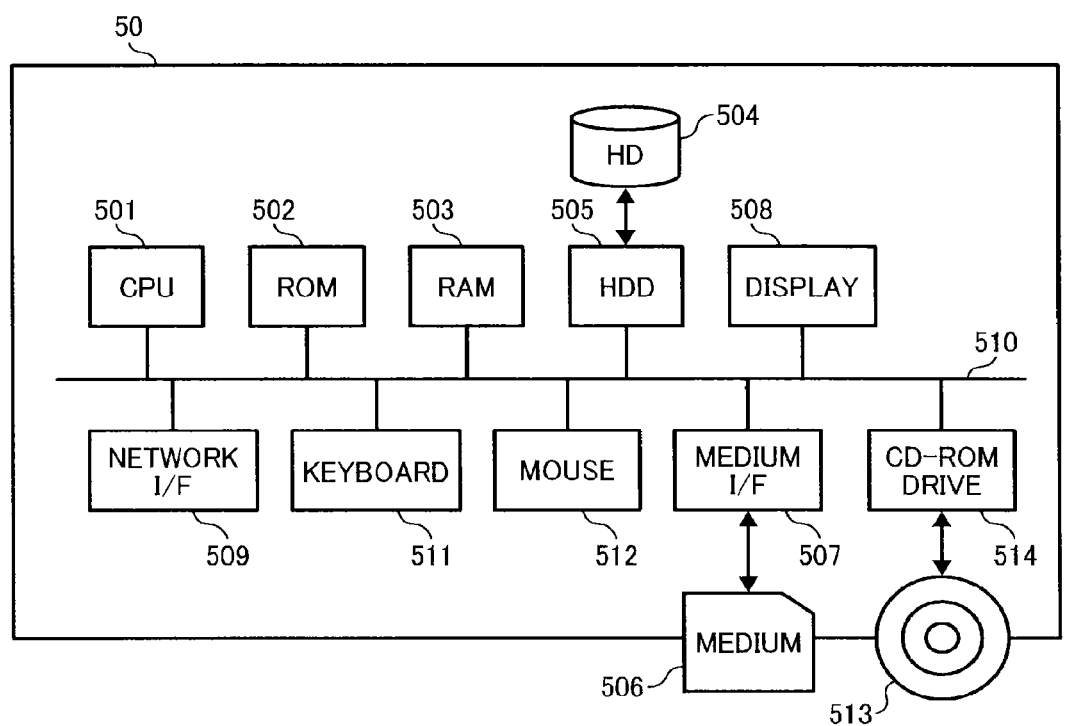
FIG. 3 is a schematic block diagram illustrating a hardware configuration of a communication management system and a relay device of the communication system of FIG. 1.

Referring to FIG. 3, a hardware configuration of the communication management system 50 and the relay device 30 is described according to an embodiment of the present invention. The communication management system 50, which may be implemented by a server computer, includes a central processing unit (CPU) 501, a read only memory (ROM) 502, a random access memory (RAM) 503, a hard disk (HD) 504, a hard disk drive (HDD) 505, a recording medium 506, a medium I/F 507, a display 508, a network I/F 509, a keyboard 511, a mouse 512, a CD-ROM drive 514, and a bus line 510.

The CPU 510 controls entire operation of the communication management system 50. The ROM 502 stores a control program for controlling the CPU 501 such as an IPL. The RAM 503 is used as a work area for the CPU 501. The HD 504 stores various data such as the communication management program. The HDD 505 controls reading or writing of various data to or from the HDD 504 under control of the CPU 501. The medium I/F 507 controls reading or writing of data with respect to a recording medium 506 such as a flash memory. The display 508 displays various information such as a cursor, menu, window, characters, or image. The network I/F 509 allows communication of data with an external device through the communication network 2 such as the Internet. The keyboard 511 is one example of input device provided with a plurality of keys for allowing a user to input characters, numerals, or various instructions. The mouse 512 is one example of input device for allowing the user to select a specific instruction or execution, select a target for processing, or move a cursor being displayed. The CD-ROM drive 514 reads or writes various data with respect to a CD-ROM 513, which is one example of removable recording medium.

The bus line 510 may be an address bus or a data bus, which electrically connects various elements such as the CPU 501 of FIG. 3.

Since the relay device 30 in FIG. 1 is substantially similar in hardware configuration to the communication management system 50, the description thereof is omitted. The relay device 30, however, stores a relay control program in the HD 504 in alternative to the management program.

<Hardware Configuration of Electronic Whiteboard>

Figure 4:
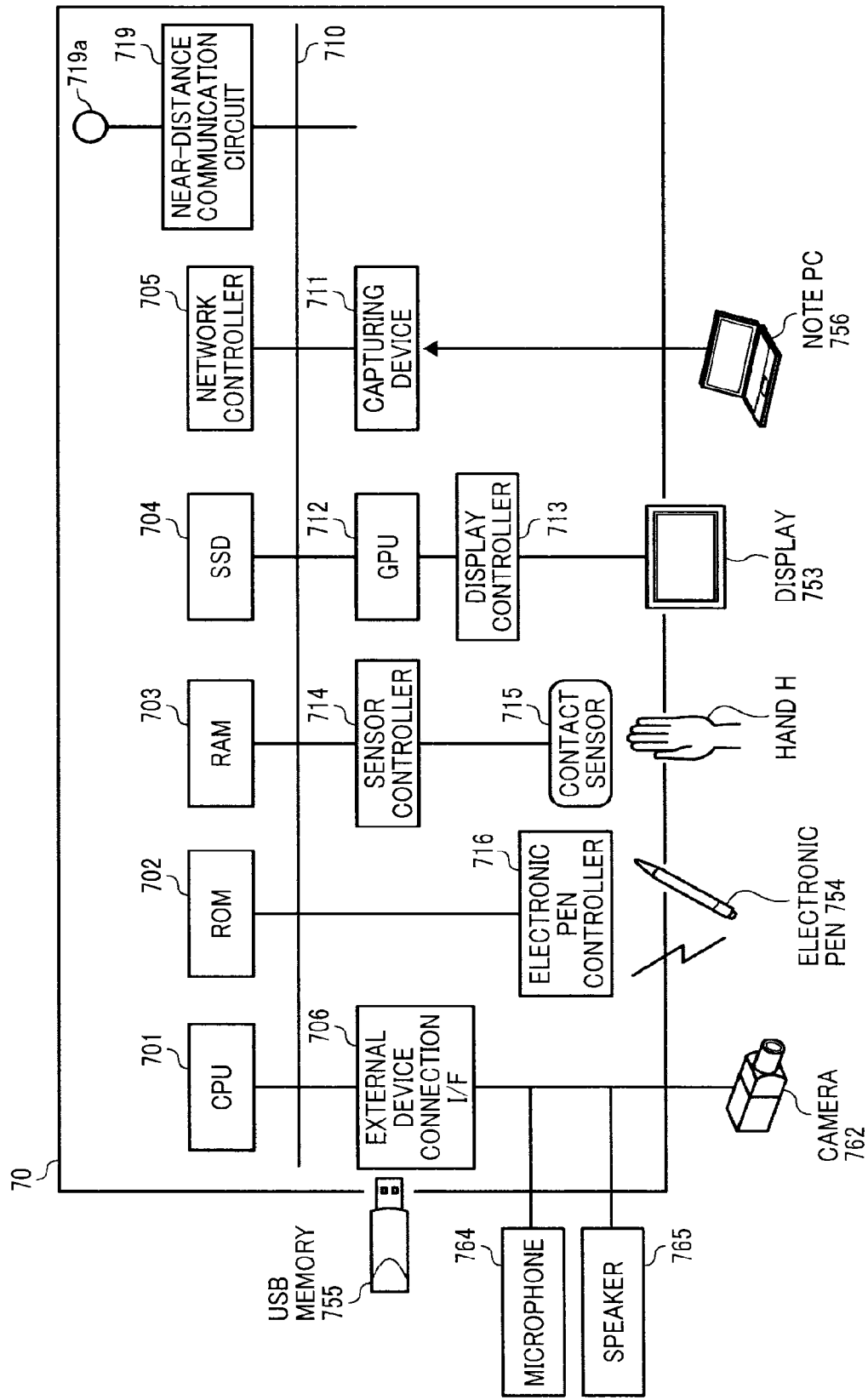
FIG. 4 is a schematic block diagram illustrating a hardware configuration of an electronic whiteboard of the communication system of FIG. 1.

FIG. 4 illustrates a hardware configuration of the communication terminal 70, when implemented by the electronic whiteboard, according to the embodiment. As illustrated in FIG. 4, the electronic whiteboard 70, as an example of communication terminal 70, includes a CPU 701, a ROM 702, a RAM 703, a SSD 704, a network controller 705, and an external device connection I/F 706, which are connected through a bus line 710.

The CPU 701 controls entire operation of the electronic whiteboard 70. The ROM 702 stores a control program for controlling the CPU 701 such as an IPL. The RAM 503 is used as a work area for the CPU 701. The SSD 704 stores various data such as the control program for the electronic whiteboard 70. The network controller 705 controls communication with an external device through the communication network 2. The external device connection I/F 706 controls communication with an external device such as a USB memory 755, and external devices such as a camera 762, a speaker 765, a microphone 764, etc.

The electronic whiteboard 70 further includes a capturing device 711, a graphics processing unit (GPU) 712, a display controller 713, a sensor controller 714, a contact sensor 715, an electronic pen controller 716, a near-distance communication circuit 719, and an antenna 719a for the near-distance communication circuit 719.

The capturing device 711 causes a display of a notebook PC 756 to display a video image or a still image based on image data that is captured by the capturing device 711. In this way, the image being displayed on a display 753 of the electronic whiteboard 70 can be shared with the external display. The GPU 712 is a semiconductor chip dedicated to processing a graphical image. The display controller 713 controls display of an image processed at the GPU 712 for output through the display 753 provided with the electronic whiteboard 70. The contact sensor 715 detects a touch onto the display 753 with an electronic pen 754 or a user's hand H. The sensor controller 714 controls operation of the contact sensor 715. The contact sensor 715 senses a touch input to a specific coordinate on the display 735 using the infrared blocking system. More specifically, the display 753 is provided with two light receiving elements disposed on both upper side ends of the display 753, and a reflector frame. The light receiving elements emit a plurality of infrared rays in parallel to a touch panel of the display 753. The light receiving elements receive lights passing in the direction that is the same as an optical path of the emitted infrared rays, which are reflected by the reflector frame. The contact sensor 715 outputs an identifier (ID) of the infrared ray that is blocked by an object (such as the user's hand) after being emitted from the light receiving elements, to the sensor controller 714. Based on the ID of the infrared ray, the sensor controller 715 detects a specific coordinate that is touched. The electronic pen controller 716 communicates with the electronic pen 754 to detect a touch by the tip or bottom of the pen 754 to the display 753. The near-distance communication circuit 719 is a communication circuit that communicates in compliance with the NFC (Registered Trademark), the Bluetooth (Registered Trademark), and the like.

The bus line 710 is an address bus or a data bus, which electrically connects the elements in FIG. 4 such as the CPU 701.

The contact sensor 715 is not limited to the infrared blocking system type, and may be a different type of detector, such as a capacitance touch panel that identifies the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by contact of an object to a display. In addition or in alternative to detecting a touch by the tip or bottom of the pen 754, the electronic pen controller 716 may also detect a touch by another part of the electronic pen 754, such as a part held by a hand.

In the above-described embodiment, the example case where the communication terminal is implemented by the videoconference terminal 10 or the electronic whiteboard 70 is described. Alternatively, the communication terminal may be implemented by any other device capable of communicating, such as a smart phone or a tablet.

<Hardware Configuration of Smart Phone>

Figure 5:
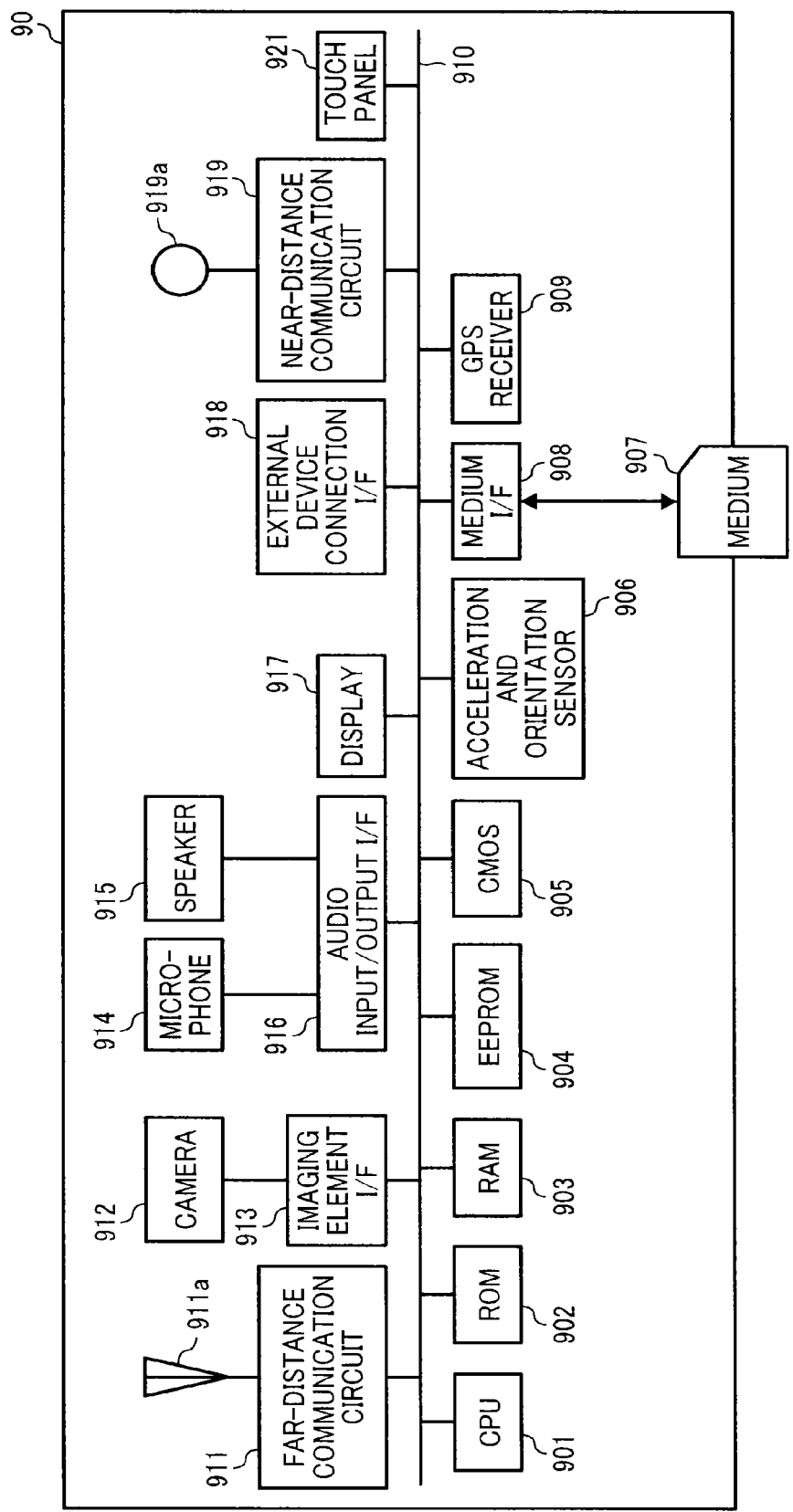
FIG. 5 is a schematic block diagram illustrating a hardware configuration of a smart phone or a tablet of the communication system of FIG. 1.

FIG. 5 illustrates a hardware configuration of a smart phone, according to the embodiment of the present invention. As illustrated in FIG. 5, the communication terminal 90, which may be implemented by a smart phone, includes a CPU 901, a ROM 902, a RAM 903, an Electrically Erasable and Programmable ROM (EEPROM) 904, a Complementary Metal Oxide Semiconductor (CMOS) sensor 905, an acceleration and orientation sensor 906, a medium I/F 908, and a GPS receiver 909, which are connected through a bus line 910.

The CPU 901 controls entire operation of the smart phone 90. The ROM 902 stores a control program for controlling the CPU 901 such as an IPL. The RAM 903 is used as a work area for the CPU 901. The EEPROM 904 reads or writes various data such as a communication terminal control program under control of the CPU 901. The CMOS sensor 905 captures an object under control of the CPU 901 to obtain captured image data. The acceleration and orientation sensor 906 includes various sensors such as an electromagnetic compass or gyrocompass for detecting geomagnetism, and an acceleration sensor. The medium I/F 908 controls reading or writing of data with respect to a recording medium 907 such as a flash memory. The GPS receiver 909 receives a GPS signal from a GPS satellite.

The communication terminal 90 further includes a far-distance communication circuit 911, a camera 912, an imaging element I/F 913, a microphone 914, a speaker 915, an audio input/output I/F 916, a display 917, an external device connection I/F 918, a near-distance communication circuit 919, an antenna 919a for the near-distance communication circuit 919, and a touch panel 921.

The far-distance communication circuit 911 is a circuit that communicates with the other device through a communication network 3 such as a mobile communication network. The camera 912 is an example of imaging device capable of capturing a subject under control of the CPU 901, and is incorporated in the communication terminal 90, which is the smart phone. The imaging element device I/F 913 is a circuit that controls driving of the camera 912. The microphone 914 is an example of audio collecting device capable of inputting audio under control of the CPU 901, and is incorporated in the communication terminal 90. The audio I/O I/F 916 is a circuit for inputting or outputting an audio signal between the microphone 914 and the speaker 915 under control of the CPU 901. The display 915 may be a liquid crystal or organic electro-luminescence (EL) display that displays an image of a subject, an operation icon, or the like. The external device connection I/F 918 is an interface circuit that connects the terminal 90 to various external devices. The near-distance communication circuit 919 is a communication circuit that communicates in compliance with the NFC (Registered Trademark), the Bluetooth (Registered Trademark), and the like. The touch panel 921 is an example of input device that enables the user to input a user instruction through touching a screen of the display 917.

The bus line 910 is an address bus or a data bus, which electrically connects the elements in FIG. 5 such as the CPU 901.

The communication terminal 90 may be implemented by a tablet, a smart watch, portable phone, or portable game machine.

Further, the terminal control program may be recorded in a file in a format installable or executable on a computer-readable recording medium such as the recording medium 907 for distribution. Examples of the recording medium include, but not limited to, a compact disc-recordable (CD-R), digital versatile disc (DVD), blue-ray disc, and SD card.

<Configuration of Communication System>

Figure 6:
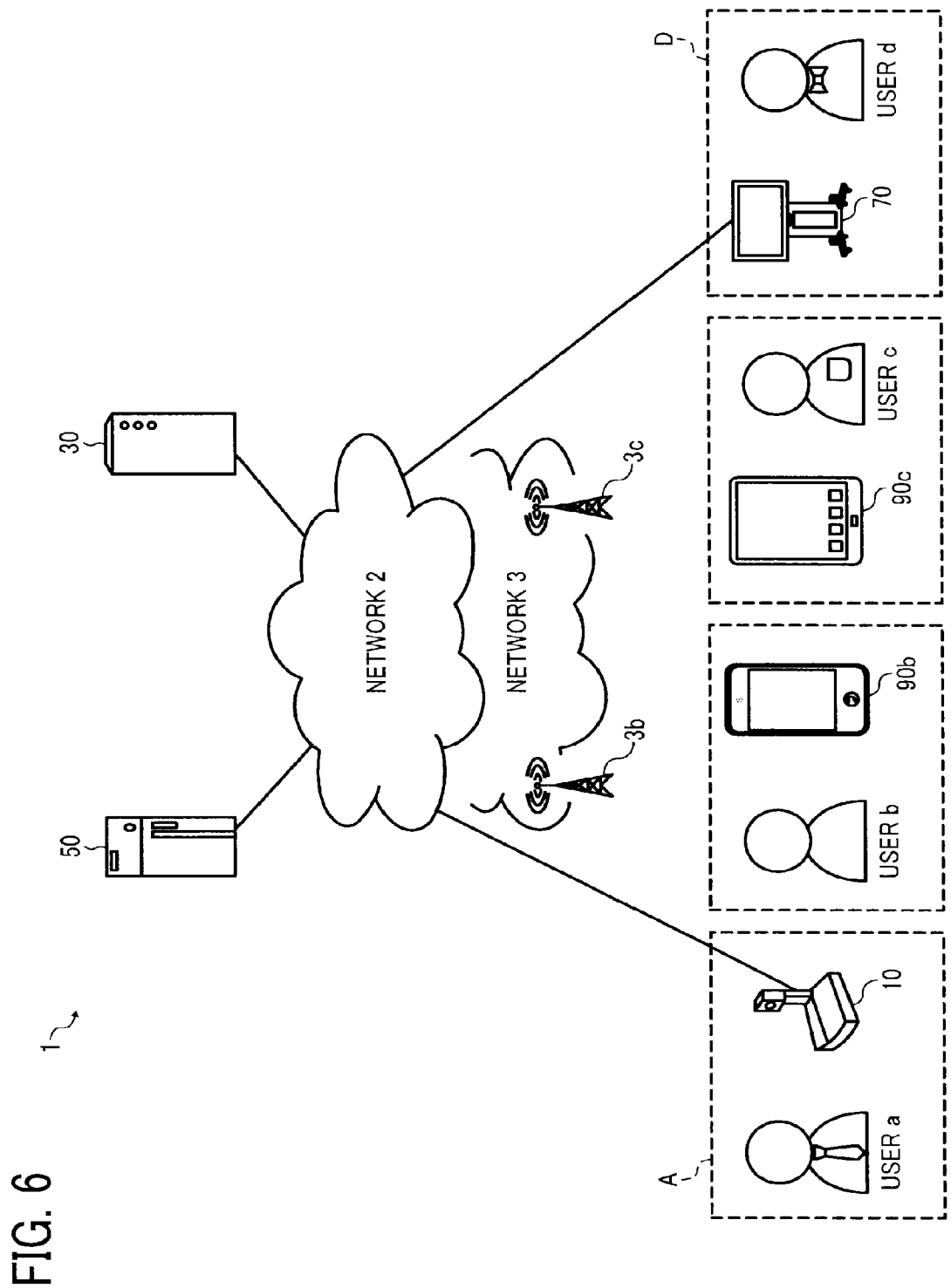
FIG. 6 is a schematic diagram illustrating a network configuration of the communication system of FIG. 1.

Referring now to FIG. 6, a configuration of the communication system 1 is described according to the embodiment. FIG. 6 is a schematic diagram illustrating a network configuration of the communication system 1 of FIG. 1.

In FIG. 6, the communication terminal such as the videoconference terminal 10, the electronic whiteboard 70, the relay device 30, and the communication management system 50, are connected to the communication network 2 including the Internet. The communication network 2 may include wireless network, in addition to wired network. In this example, the communication network 2 includes the communication network 3 that is the mobile communication network. In this example, the communication terminal 10 is provided at a site A, and the communication terminal 70 is provided at a site D. For example, the site A may be Japan, and the site B may be England. The communication network 2 may further include communication terminals 90b and 90c, each being a mobile terminal. The communication terminal 90b is connected to the communication network 2 via a base station 3b and the communication network 3. The communication terminal 90c is connected to the communication network 2 via a base station 3c and the communication network 3. With this configuration, each one of the communication terminals 90b and 90c, the relay device 30, and the communication management system 50 are communicable with one another.

<Functional Configuration of Communication System>

Figure 7B:
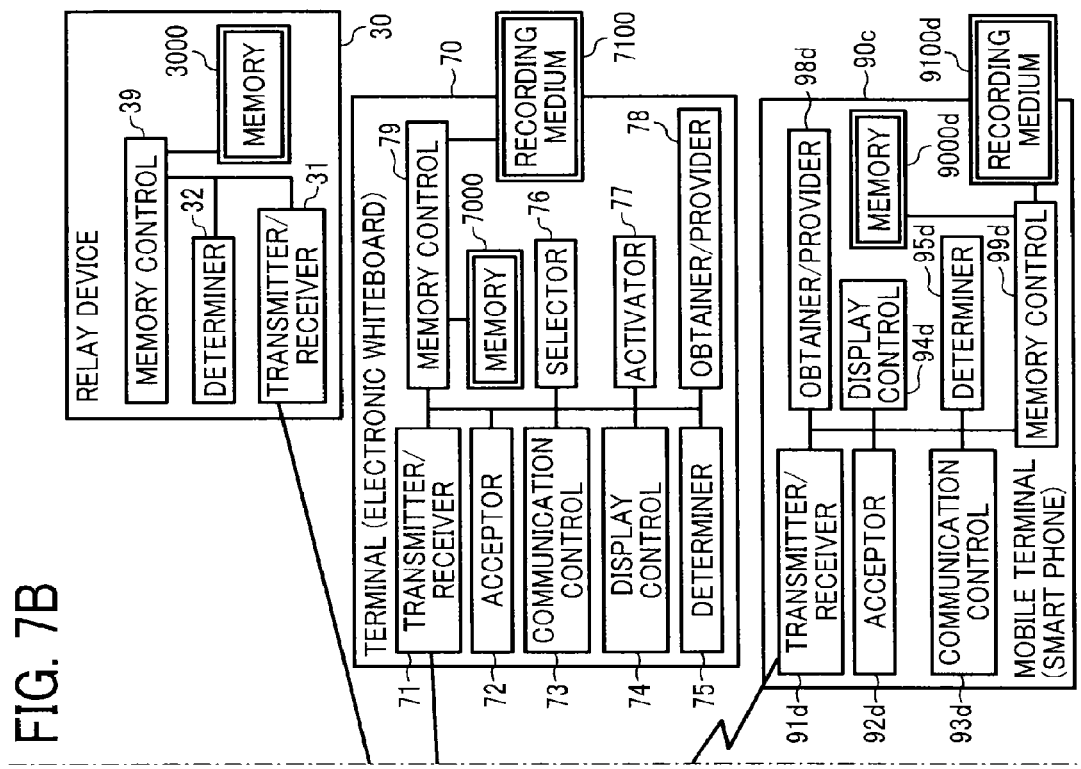

Referring now to FIGS. 2 to 5, and 7, a functional configuration of the communication system 1 of FIG. 1 is described according to the embodiment of the present invention. FIG. 7 is a schematic block diagram illustrating a functional configuration of the communication system 1 of FIG. 1 according to the embodiment of the present invention.

<Functional Configuration of Communication Terminal>

The communication terminal 10 includes a transmitter/receiver 11, an acceptor 12, a communication control 13, a display control 14, a determiner 15, a selector 16, an activator 17, an obtainer/provider 18, and a memory control 19. These units are functions that are implemented by or that are caused to function by operating any of the hardware components illustrated in FIG. 2 in cooperation with the instructions of the CPU 101 according to the communication control program expanded from the flash memory 104 to the RAM 103. The communication terminal 10 further includes a memory 1000 configured by the RAM 103 illustrated in FIG. 2, and the flash memory 104 illustrated in FIG. 2. The communication terminal 10 may be provided with a recording medium 1100 that is removable.

(Functional Configuration of Communication Terminal)

Next, a functional configuration of the communication terminal 10 is described in detail. The transmitter/receiver 11, which may be implemented by the instructions of the CPU 101, the network I/F 111, and the external device connection I/F 118, illustrated in FIG. 2, transmits or receives various data (or information) to or from the other terminal, apparatus, or system through the communication network 2. Before starting communication with a counterpart terminal, the transmitter/receiver 11 starts receiving terminal state information indicating an operating state of each communication terminal as a candidate counterpart terminal, from the communication management system 50. The state information not only indicates the operating state of each communication terminal 10 (whether the communication terminal 10 is online or offline), but also indicates a detailed state such as whether the communication terminal 10 whose state is online is now capable of communicating or is currently communicating, or the user of the communication terminal 10 is not at the communication terminal 10. Hereinafter, the case in which the state information indicates the operating state will be described by way of example.

The transmitter/receiver 11 further controls processing to start communication between the communication terminal 10 and a counterpart communication terminal such as the communication terminal 70.

The acceptor 12, which is implemented by the instructions of the CPU 101 illustrated in FIG. 2 and by the operation key 108 and the power switch 109 illustrated in FIG. 2, accepts various inputs from the user.

The communication control 13 is implemented by the instructions of the CPU 101, and any desired device relating to input or output of content data. In one example, the communication control 13 is implemented by the instructions of the CPU 101 illustrated in FIG. 2 and by the camera 112 and the imaging element I/F 113 illustrated in FIG. 2. The communication control 13 captures an image of a subject and outputs image data obtained by capturing the image. In one example, the communication control 13 is implemented by the instructions of the CPU 101 illustrated in FIG. 2 and by the audio input/output I/F 116 illustrated in FIG. 2. After the sound of the user is converted to an audio signal by the microphone 114, the communication control 13 receives audio data according to this audio signal. In another example, the communication control 13 is implemented by the instructions of the CPU 101 illustrated in FIG. 2 and by the audio input/output I/F 116 illustrated in FIG. 2, and outputs the audio signal according to the audio data to the speaker 115, and the speaker 115 outputs audio.

The display control 14 is implemented by the instructions of the CPU 101 illustrated in FIG. 2 and by the display I/F 117 illustrated in FIG. 2. The display control 14 combines images of different resolutions and transmits the combined image to the display 120. The display control 14 also transmits information on a contact list, received from the communication management system 50, to the display 120, and controls display of the contact list on the display 120.

The determiner 15, which may be implemented by the instructions of the CPU 101 illustrated in FIG. 2, outputs a determination result.

The selector 16, which may be implemented by the instructions of the CPU 101 illustrated in FIG. 2, selects a function or communication application according to a user instruction accepted at the acceptor 12. For example, the selector 16 selects communication application to be activated based on the terminal identification information of the counterpart communication terminal.

In this embodiment, the terminal identification not only includes a terminal ID, but also includes an IP address to be used for accessing the communication terminal, an email address of the communication terminal, a user ID identifying a user operating the communication terminal, and a user name of such user operating the communication terminal.

The activator 17, which may be implemented by the instructions of the CPU 101 illustrated in FIG. 2, activates the communication application selected by the selector 16.

The obtainer/provider 18, which may be implemented by the instructions of the CPU 101 and the near-distance communication circuit 119 with the antenna 119a, illustrated in FIG. 2, communicates with the outside terminal, such as a mobile terminal, to transmit (provide) data or receive (obtain) data to or from the terminal.

The memory control 19, which is implemented by the instructions of the CPU 101 and the SSD 105 illustrated in FIG. 2, or by the instructions of the CPU 101, performs processing to store various types of data in the memory 1000 or the recording medium 1100 or to read various types of data stored in the memory 1000 or the recording medium 1100. Further, every time image data and audio data are received in performing communication with a counterpart terminal, the memory 1000 overwrites the image data and audio data. The display 120 displays an image based on image data before being overwritten, and the speaker 115 outputs audio based on audio data before being overwritten. The recording medium 1100 is implemented by the recording medium 106 illustrated in FIG. 2.

Note that the terminal identification information in the embodiment is an example of identification information that is used to uniquely identify a specific communication terminal (10, 70) or the user operating such terminal, such that a language, a character(s), a symbol(s), or various marks are not limited to the above-described embodiment. For example, a combination of at least two of the above-mentioned language, character(s), symbol(s), and various marks may be used as the terminal identification information. Further, the terminal identification information may include not only the terminal ID, but also a user ID for identifying the user, and a machine-specific number such as a manufacturing number. Further, the user ID may include a name of the user, the individual number that uniquely assigns each user such as a social security number, etc.

<Functional Configuration of Relay Device>

The relay device 30 includes a transmitter/receiver 31, a determiner 32, a generator 33, and a memory control 39. These units are functions that are implemented by or that are caused to function by operating any of the elements illustrated in FIG. 3 in cooperation with the instructions of the CPU 501 according to the relay device control program expanded from the HD 504 to the RAM 503. The relay device 30 also includes a memory 3000 implemented by the RAM 504 illustrated in FIG. 3 and/or the RD 504 illustrated in FIG. 3.

(Data Management Table)

FIG. 8 is an illustration of an example data structure of a data management table. The memory 300 stores a data management DB 3001 configured by the data management table illustrated in FIG. 8. The data management table of FIG. 8 stores, for each content data (image data or audio data) transmitted from the counterpart communication terminal, a data ID for identifying a transmission source of the content data and an IP address of the transmission source, in association with each other. The data ID can be extracted from the received content data, as such data ID has been added to the content data being transmitted. The IP address of the transmission source, that is, the counterpart communication terminal that sends the content data is transmitted together with the content data.

(Functional Configuration of Relay Device)

Next, a functional configuration of the relay device 30 is described in detail. In the following description of functional configuration of the relay device 30, relationships of the hardware elements in FIG. 3 with the functional configuration of the relay device 30 in FIG. 7 will also be described.

The transmitter/receiver 31 of the relay device 30 illustrated in FIG. 7, which is implemented by the instructions of the CPU 501 illustrated in FIG. 3 and by the network I/F 509 illustrated in FIG. 3, transmits or receives various types of data (or information) to or from another terminal, device, or system via the communication network 2. The transmitter/receiver 31 also serves as a transferer, which transfers content data transmitted from one communication terminal (such as the communication terminal 10) to another communication terminal (such as the communication terminal 70).

The determiner 32, which may be implemented by the instructions of the CPU 501 illustrated in FIG. 3, determines delay of data transmission.

The generator 33, which may be implemented by the instructions of the CPU 501 illustrated in FIG. 3, generates a data ID for uniquely identifying data within the same communication session. As described above, the data ID is added to the content data (image data and audio data) when such content data is transmitted from one communication terminal to the other communication terminal. With this data ID, the communication terminal as a transmission destination is able to identify the transmission source.

The memory control 39, which may be implemented by the instructions of the CPU 501 illustrated in FIG. 3 and the HDD 505 illustrated in FIG. 3, performs processing to store various types of data in the memory 3000 or read various types of data stored in the memory 3000.

<Functional Configuration of Management System>

The communication management system 50 includes a transmitter/receiver 51, a determiner 52, a generator 53, and a memory control 59. These units are functions that are implemented by or that are caused to function by operating any of the elements illustrated in FIG. 7 in cooperation with the instructions of the CPU 501 according to the communication management program expanded from the HD 504 to the RAM 503. In addition, the communication management system 50 includes a memory 5000 configured by the HD 504 illustrated in FIG. 3.

(Authentication Management Table)

FIG. 9 is an illustration of an example data structure of an authentication management table. The memory 5000 stores an authentication management DB 5001 configured by the authentication management table illustrated in FIG. 9. The authentication management table stores, for each one of the terminals managed by the communication management system 50, the terminal ID and the password in association with each other. For example, the authentication management table illustrated in FIG. 9 indicates that the terminal ID of the terminal 10*aa* is "01aa", and the password of the terminal 10*aa* is "aaaa". Note that the terminal 10*aa* in FIG. 9 is one example of the communication terminal 10 illustrated in FIG. 6.

(Terminal Management Table)

FIG. 10 is an illustration of an example data structure of a terminal management table. The memory 5000 stores a terminal management DB 5002 such as the terminal management table illustrated in FIG. 10. The terminal management table stores, for each one of the terminals (such as the communication terminals 10 and 70) managed by the communication management system 50, the terminal ID of the terminal, a counterpart terminal name in the case where the terminal serves as a counterpart terminal, the operating state of the terminal, a date/time received at which login request information described later is received at the communication management system 50, and the IP address of the terminal, in association with one another. For example, the terminal management table illustrated in FIG. 10 indicates that the terminal 10*aa* with the terminal ID "01aa" has the counterpart terminal name "AA terminal, Tokyo office, Japan", the operating state "online (communication OK)", the date/time received at which login request information is received by the communication management system 50 "Apr. 10, 2015, 13:40", and the IP address "1.2.1.3". The terminal ID, the terminal (counterpart) name, and the terminal IP address in the terminal management table of FIG. 10 is registered by the communication management system 50, when the communication management system 50 accepts registration of each communication terminal that requests services from the communication management system 50.

(Contact List Management Table)

FIG. 11 is an illustration of an example data structure of a contact list management table. The memory 5000 further stores a contact list management DB 5004 implemented by the contact list management table illustrated in FIG. 11. The contact list management table stores, for each one of the terminals managed by the communication management system 50, the terminal ID of the terminal (starting terminal) that requests to start communication, in association with the terminal IDs of all counterpart terminals registered as candidate counterpart terminals for the starting terminal. For example, the contact list management table illustrated in FIG. 11 indicates that candidates for a counterpart terminal to which a starting terminal (terminal 10*aa*) whose terminal ID is "01aa" can send a request to start communication in a videoconference are the terminal 10*ab* whose terminal ID is "01ab", the terminal 10*ba* whose terminal ID is "01ba", the terminal 70*bb* whose terminal ID is "07bb", and so forth. Note that the terminal 70*bb* is one example of the communication terminal 70, as the electronic whiteboard 70 in FIG. 6. The candidate counterpart terminals are updated by addition or deletion in response to an addition or deletion request received from an arbitrary terminal (starting terminal) to the communication management system 50.

The contact list is just one example of contact information indicating a candidate of counterpart communication terminals, such that the contact information may be managed in various ways other than in the form of contact list, as long as the counterpart terminal information is associated with the starting terminal.

(Group Management Table)

FIG. 12 is an illustration of an example data structure of a group management table. The memory 5000 stores a group management DB 5004 such as a group management table illustrated in FIG. 12. The group management table stores, for each one of the plurality of communication terminals, a terminal ID, and a group ID indicating a group to which the communication terminal belongs, in association with each other. The group management table is used for managing a group to which each communication terminal belongs.

In addition to the above-described DBs, the memory 5000 may further store any other database, such as a session management table that stores information regarding a plurality of communication terminals currently communicating through a communication session.

(Functional Configuration of Management System)

Next, referring back to FIG. 7, a functional configuration of the communication management system 50 will be described in detail. In the following description of the functional configuration of the communication management system 50, relationships of the hardware configuration of FIG. 3 with functional configuration of the management system 50 in FIG. 7 will also be described.

The transmitter/receiver 51, which is implemented by the instructions of the CPU 501 illustrated in FIG. 3 and by the network I/F 509 illustrated in FIG. 3, transmits or receives various types of data (or information) to or from another terminal, device, or system via the communication network 2.

The determiner 15, which may be implemented by the instructions of the CPU 501 illustrated in FIG. 3, outputs a determination result.

The generator 53, which may be implemented by the instructions of the CPU 501 illustrated in FIG. 3, generates a group ID for identifying a group to which the communication terminal 10 belongs in response to a request from the communication terminal 10.

The memory control 59, which may be implemented by the instructions of the CPU 501 illustrated in FIG. 3 and the HDD 505 illustrated in FIG. 3, performs processing to store various types of data in the memory 5000 or read various types of data stored in the memory 5000.

<Functional Configuration of Communication Terminal>

The communication terminal 70 includes a transmitter/receiver 71, an acceptor 72, a communication control 73, a display control 74, a determiner 75, a selector 76, an activator 77, an obtainer/provider 78, and a memory control 79. These units are functions that are implemented by or that are caused to function by operating any of the elements illustrated in FIG. 4 in cooperation with the instructions of the CPU 701 according to the communication control program expanded from the SSD 704 to the RAM 703. The communication terminal 70 further includes a memory 7000 configured by the RAM 703 illustrated in FIG. 4, and the SSD 704 illustrated in FIG. 4. The communication terminal 70 may be provided with a recording medium 7100 that is removable.

(Functional Configuration of Communication Terminal)

Next, a functional configuration of the communication terminal 70 is described in detail. The transmitter/receiver 71, which may be implemented by the instructions of the CPU 701, the network controller 705, and the external device connection I/F 706, illustrated in FIG. 4, transmits or receives various data (or information) to or from the other terminal, apparatus, or system through the communication network 2. Before starting communication with a counterpart terminal, the transmitter/receiver 71 starts receiving terminal state information indicating an operating state of each communication terminal as a candidate counterpart terminal, from the communication management system 50. The state information not only indicates the operating state of each communication terminal 10 (whether the communication terminal 10 is online or offline), but also indicates a detailed state such as whether the communication terminal 10 whose state is online is now capable of communicating or is currently communicating, or the user of the communication terminal 10 is not at the communication terminal 10. In addition, the state information not only indicates the operating state of each terminal, but also indicates various states, such as the state that the cable 120c is disconnected from the terminal, the state that the terminal can output sounds but not images, or the state that the terminal is muted. Hereinafter, the case in which the state information indicates the operating state will be described by way of example.

The transmitter/receiver 71 further controls processing to start communication with the other communication terminal such as the counterpart communication terminal 10.

The acceptor 72, which is implemented by the instructions of the CPU 701, the contact sensor 715, and the electronic pen controller 716, illustrated in FIG. 4, accepts various inputs from the user.

The communication control 73 is implemented by the instructions of the CPU 701, in cooperation with any desired device relating to input or output of content data. In one example, the communication control 13 applies image processing to an image captured by the camera 762. In another example, the communication control 73, after the audio of the user is converted to an audio signal by the microphone 764, the communication control 13 processes audio data based on this audio signal. In another example, the communication control 73 outputs the audio signal according to the audio data to the speaker 765, and the speaker 765 outputs audio.

In another example, the communication control 73 obtains drawing data, drawn by the user with the electronic pen 754 or the user's hand H onto the display 753, and converts the drawing data to coordinate data. Further, when the communication terminal 70 transmits the coordinate data to the other communication terminal 70, the other communication terminal causes the display 753 to display drawing data based on the coordinate data received from the communication terminal 70.

The display control 74 is implemented by the instructions of the CPU 701 illustrated in FIG. 4 and by the display controller 713 illustrated in FIG. 4. The display control 74 combines images of different resolutions and transmits the combined image to the display 753. The display control 74 also transmits information on a contact list, received from the communication management system 50, to the display 753, and controls display of the contact list on the display 753.

The determiner 75, which may be implemented by the instructions of the CPU 701 illustrated in FIG. 4, determines whether an outside terminal such as a mobile terminal is within a predetermined distance from the communication terminal 70.

The selector 76, which may be implemented by the instructions of the CPU 701 illustrated in FIG. 4, selects a function or communication application according to a user instruction accepted at the acceptor 70.

The activator 77, which may be implemented by the instructions of the CPU 701 illustrated in FIG. 4, activates the communication application selected by the selector 76.

The obtainer/provider 78, which may be implemented by the instructions of the CPU 701, the near-distance communication circuit 719 with the antenna 719a, illustrated in FIG. 4, communicates with the outside terminal to transmit (provide) data or receive (obtain) data to or from the terminal.

The memory control 79, which is implemented by the instructions of the CPU 701 and the SSD 704 illustrated in FIG. 4, or by the instructions of the CPU 701, performs processing to store various types of data in the memory 7000 or the recording medium 7100 or to read various types of data stored in the memory 7000 or the recording medium 7100. Further, every time image data and audio data are received in performing communication with a counterpart terminal, the memory 7000 overwrites the image data and audio data. The display 753 displays an image based on image data before being overwritten, and the speaker 765 outputs audio based on audio data before being overwritten. The recording medium 7100 is implemented by the USB memory 755 illustrated in FIG. 4.

<Functional Configuration of Communication Terminal>

Since the communication terminal 90b and the communication terminal 90c are substantially similar in functional configuration, the functional configuration of the communication terminal 90b is described as an example while omitting explanation of the communication terminal 90c. The communication terminal 90b includes a transmitter/receiver 91b, an acceptor 92b, a communication control 93b, a display control 94b, a determiner 95b, an obtainer/provider 98b, and a memory control 99b.

These units are functions that are implemented by or that are caused to function by operating any of the hardware elements illustrated in FIG. 5 in cooperation with the instructions of the CPU 901 according to the communication control program expanded from the EEPROM 904 to the RAM 903. The communication terminal 90b further includes a memory 9000b configured by the RAM 903 illustrated in FIG. 5, and the EEPROM 704 illustrated in FIG. 5. The communication terminal 90 may be provided with a recording medium 9100b that is removable.

(Functional Configuration of Communication Terminal)

Next, a functional configuration of the communication terminal 90b is described in detail. The transmitter/receiver 91b, which may be implemented by the instructions of the CPU 901, and the near-distance communication circuit 911 with the antenna 911a, illustrated in FIG. 5, transmits or receives various data (or information) to or from the other terminal, apparatus, or system through the communication network 3.

The acceptor 92b, which is implemented by the instructions of the CPU 901 illustrated in FIG. 5 and by the touch panel 921 illustrated in FIG. 5, accepts various inputs from the user.

The communication control 93b is implemented by the instructions of the CPU 901 in cooperation with any desired device relating to input or output of content data. In one example, the communication control 93b, implemented by the instructions of the CPU 901 in cooperation with the imaging element I/F 913, applies image processing to an image captured by the camera 912. In another example, the communication control 93b is implemented by the instructions of the CPU 901 in cooperation with the audio input/output I/F 916. After the audio of the user is converted to an audio signal by the microphone 914, the communication control 93b processes audio data based on this audio signal. In another example, the communication control 93b, implemented by the instructions of the CPU 901 and the audio input/output I/F 916, outputs the audio signal according to the audio data to the speaker 915, and the speaker 915 outputs audio.

The display control 94b, which may be implemented by the instructions of the CPU 901, controls display of an image based on the image data through the display 917.

The determiner 95b, which may be implemented by the instructions of the CPU 901 illustrated in FIG. 5, outputs a determination result.

The obtainer/provider 98b, which may be implemented by the instructions of the CPU 901, and the near-distance communication circuit 919 with the antenna 919a, illustrated in FIG. 5, communicates with the counterpart communication terminal to transmit (provide) data or receive (obtain) data to or from the counterpart communication terminal. The memory control 99b, which may be implemented by the instructions of the CPU 901 and the EEPROM 904, illustrated in FIG. 5, performs processing to store various types of data in the memory 9000b or read various types of data stored in the memory 9000b.

<Operation>

Referring to FIGS. 13 to 25, operation performed by the communication system 1 is explained according to an embodiment of the present invention.

Figure 13B:
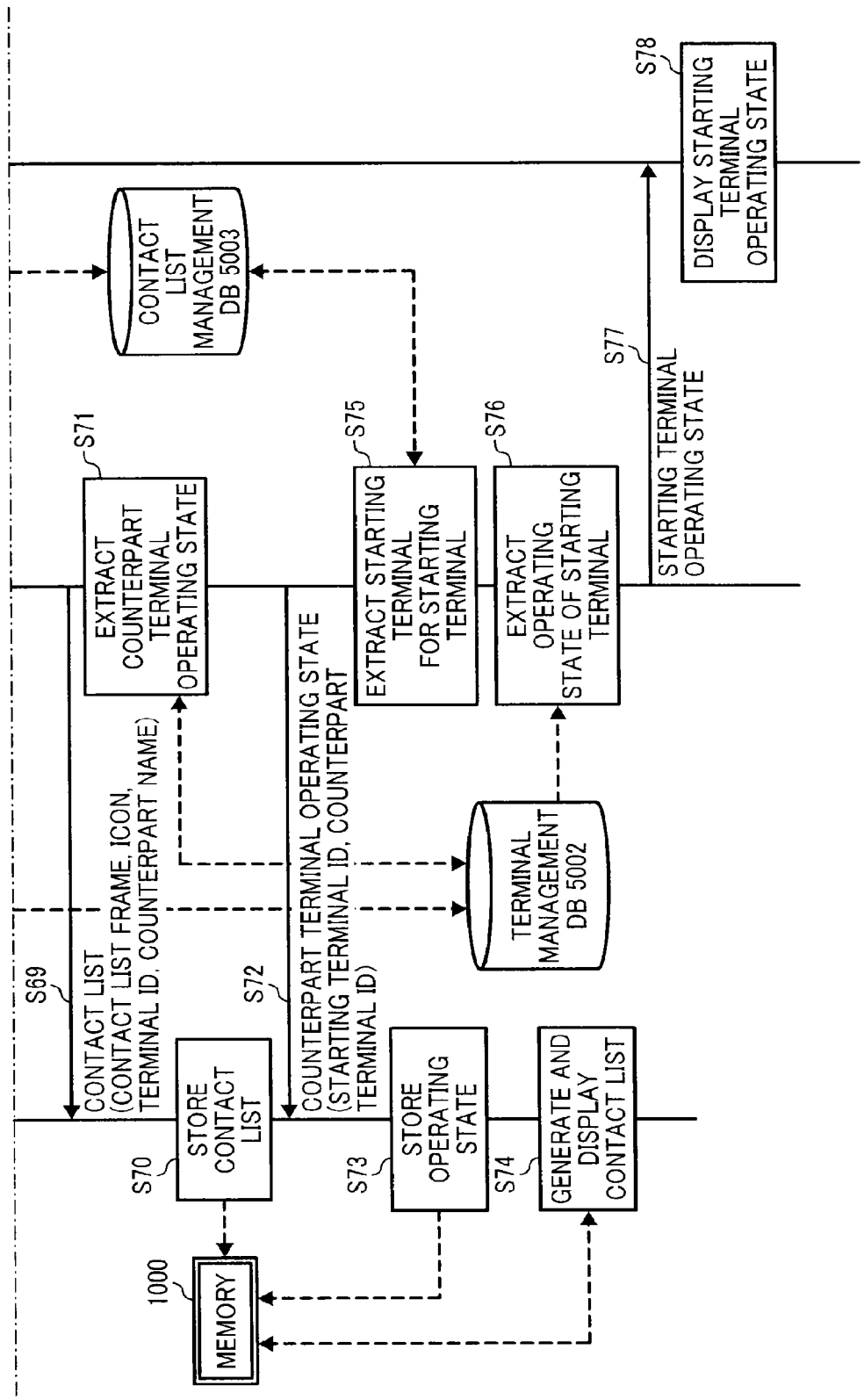

First, referring to FIGS. 13 and 14, operation of preparing for communication between the communication terminal 10 and the communication terminal 70 is explained according to an embodiment of the present invention. FIG. 13 is a data sequence diagram illustrating operation of preparing for communication between the terminal 10 and the terminal 70. FIG. 14 is an example screen of a contact list for display at the terminal 10.

For simplicity, the following describes the example case in which the communication terminal 10 and the communication terminal 70 communicate with each other via the communication management system 50. However, as illustrated in FIG. 6, the communication terminals 10, 70, 90b, and 90b are able to communicate with one another through the same communication session.

First, when the user "a" presses the operation key 108 illustrated in FIG. 2 and selects communication application to be activated, the acceptor 12 of the terminal 10 illustrated in FIG. 7 accepts a request for activating selected communication application, and activates such application (S61). The transmitter/receiver 11 of the terminal 10 transmits login request information indicating a login request to the communication management system 50 via the communication network 2 (S62). The login request information includes a terminal ID for identifying the terminal 10aa, which is a local terminal serving as a starting terminal, and a password. The terminal ID and the password are data that have been read via the memory control 19 from the memory 1000 and sent to the transmitter/receiver 11.

Next, the memory control 59 of the management system 50 performs terminal authentication by searching the authentication management table of FIG. 9 using the terminal ID and the password included in the login request information received via the data transmitter/receiver 51 as search keys, and determining whether the same terminal ID and the same password are managed in the authentication management table of FIG. 9 (S63). In the case where the memory control 59 determines that the login request is a login request received from the authenticated terminal since the same terminal ID and the same password are managed, the memory control 59 stores, in a record for the terminal ID received at S62 in the terminal management table of FIG. 10, the operating state (Online (communication OK), and the date/time received at which the above-described login request information is received. For example, if the terminal 10aa has the terminal ID "01aa", the memory control 59 stores the operating state "Online (Communication OK)" and the date/time received "4.10.2015.13:40" in association with the terminal ID "01aa" in the terminal management table illustrated in FIG. 10. Further, in this example, the terminal 10 may transmit the IP address of the terminal 10 to the management system 50 at S62. Alternatively, the terminal IP address may be previously registered in the terminal management table in association with the terminal ID.

The transmitter/receiver 51 of the management system 50 transmits authentication result information indicating an authentication result obtained by the memory control 59 to the starting terminal (terminal 10) which has sent the above-mentioned login request, via the communication network 2 (S65). In the following, the case in which it has been determined by the memory control 59 that the terminal 10 is a terminal that has a legitimate use authority will be described as follows.

As the terminal 10, which is the starting terminal, receives the authentication result information indicating that the terminal 10 is an authenticated terminal at the transmitter/receiver 11, the transmitter/receiver 11 of the terminal 10 transmits contact list request information that requests for contact list to the management system 50 through the communication network 2 (S66). The transmitter/receiver 51 of the management system 50 receives the contact list request information.

The memory control 59 of the management system 50 searches the contact list management table (FIG. 11) using the terminal ID of the starting terminal 10 which has sent the login request as a search key, to extract the terminal ID of a candidate counterpart terminal (such as the terminal IDs "01ab", "01ba", and "07bb") that can communicate with the starting terminal 10. The memory control 59 of the management system 50 further reads out the terminal name associated with each one of the extracted terminal IDs from the terminal management table (FIG. 10) (S67). In this example, at least the terminal ID and the terminal name of the terminal 70, as a counterpart terminal for the starting terminal 10, are extracted.

The memory control 59 of the communication management system 50 reads contact list frame data, and icon data reflecting the operating state of each candidate counterpart terminal that is read, from the memory 5000 (S68). The transmitter/receiver 51 further transmits the contact list information to the starting terminal 10aa (S69). The contact list information includes the contact list frame data, and the icon data, the terminal ID, and the terminal name of each candidate counterpart terminal (10 or 70). The starting terminal 10, which receives the contact list information at the transmitter/receiver 11, stores the received contact list information in the memory 1000 via the memory control 19 (S70).

As described above, in this embodiment, instead of managing contact list information at each communication terminal, the management system 50 centrally manages contact list information for all of the terminals 10. In this way, even when a communication terminal is newly added or the existing communication terminal is replaced with a different type of communication terminal, or even when contact list frame is changed, the communication management system 50 can centrally reflect such change without requiring each communication terminal to reflect such change.

The memory control 59 of the management system 50 searches the terminal management table (FIG. 10) using the extracted terminal IDs of the candidate counterpart terminals, as search keys, to obtain the operating states of the terminals (S71).

Next, the transmitter/receiver 51 of the management system 50 transmits counterpart terminal state information including the terminal IDs serving as the search keys used at S67 and the operating states of the counterpart terminals corresponding to these terminal IDs to the starting terminal 10 via the communication network 2 (S72).

The starting terminal 10 stores the terminal state information, which may be received from the management system 50 sequentially or at once, in the memory 1000 (S73). Based on the terminal state information received for each candidate counterpart terminal, the starting terminal 10 is able to know the current operating state of each candidate counterpart terminal such as the operating state of the communication terminal 70.

Based on the contact list information and the terminal state information stored in the memory 1000, the display control 14 of the starting terminal 10 generates a contact list that reflects the current operating state of each candidate counterpart terminal. The display control 14 further displays the contact list on the display 120 of FIG. 2, as illustrated in FIG. 14 (S74). In FIG. 14, the icons each reflecting the operating state of the corresponding terminal are displayed at left. More specifically, the icons in FIG. 14 indicate the operating states of "online (communication OK)", "offline", "online (communication OK)", and "online (communicating), from the top to the bottom.

The memory control 59 of the management system 50 further searches the contact list management table of FIG. 11 using the terminal ID "01aa" of the starting terminal 10aa which has sent the login request as a search key, to extract the terminal ID of another starting terminal that registers the terminal ID "01aa" of the starting terminal 10aa as a candidate counterpart terminal (S75).

Next, the memory control 59 of the management system 50 searches the contact list management table (FIG. 10) using the terminal ID of the starting terminal 10 which has sent the login request as a search key, and obtains the operating state of the starting terminal 10 (S76). In this example, it is assumed that the terminal 10aa is the communication terminal 10.

The transmitter/receiver 51 transmits counterpart terminal state information including the terminal ID "01aa" and the operating state "Online (Communication OK)" of the starting terminal 10aa, obtained at S76, to terminals (such as the terminal 70) whose operating states are "Online (Communication OK)" in the terminal management table (FIG. 10), among the terminals having the terminal IDs extracted at S76 (S77). When transmitting the counterpart terminal state information to the terminals such as the terminal 70, the transmitter/receiver 51 refers to the IP addresses of the terminals, which are managed in the terminal management table illustrated in FIG. 10, using the terminal IDs. Accordingly, the terminal ID "01aa" and the operating state "online" of the starting terminal (terminal 10aa) which has sent the login request can be transmitted to other counterpart terminals that can communicate with the starting terminal 10 (terminal 10aa). The candidate counterpart terminal (such as the terminal 70) displays the operating state of each one of the candidate counterpart terminals, as illustrated in FIG. 13.

Figure 15:
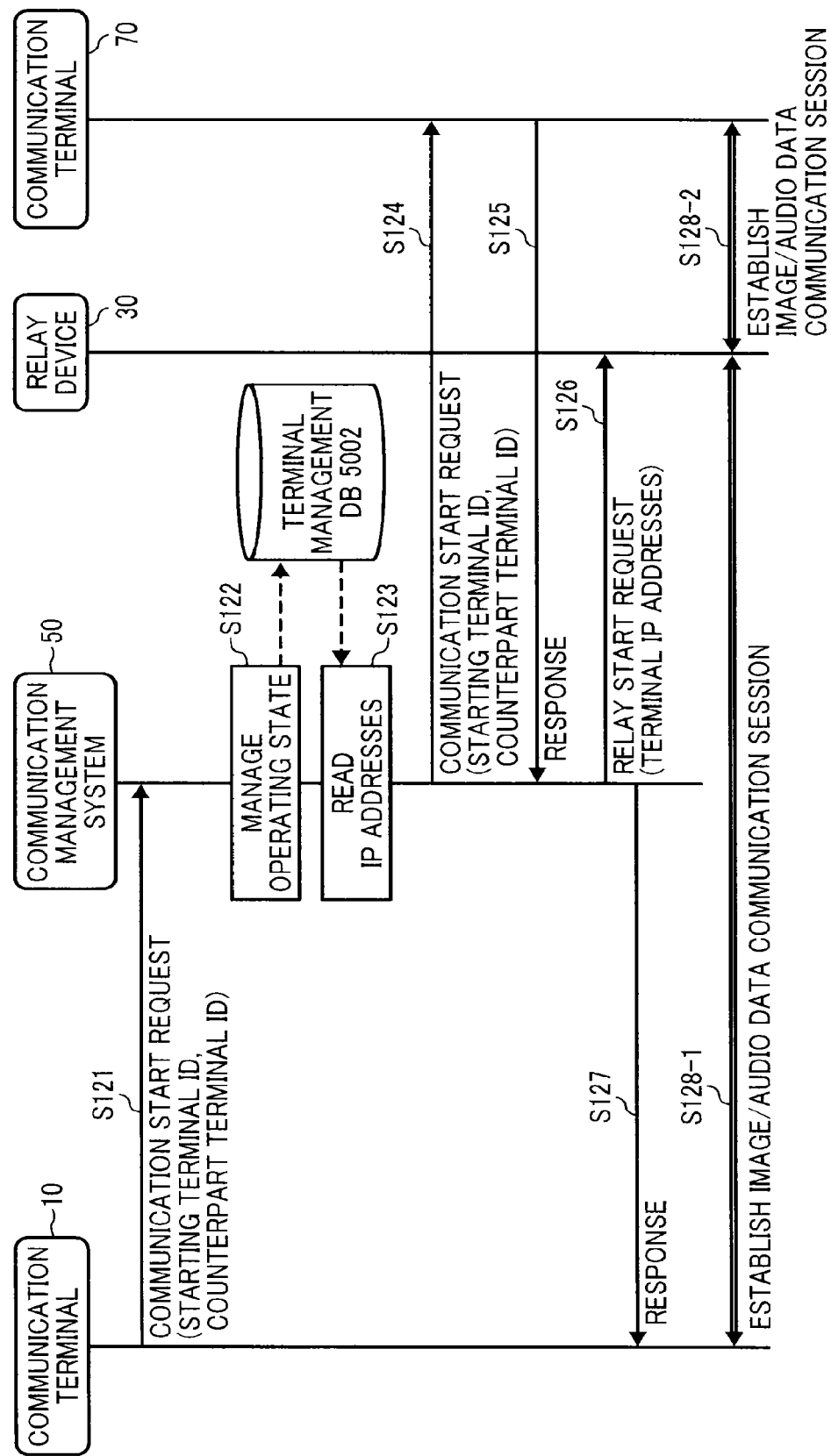
FIG. 15 is a data sequence diagram illustrating operation of transmitting image data and audio data, performed by the communication system of FIG. 1, according to the embodiment of the present invention.

Referring to FIGS. 15 and 16, operation of preparing for transmission of image data and audio data, performed by the communication system 1, is described according to an embodiment of the present invention. FIG. 15 is a data sequence diagram illustrating operation of preparing for transmission of image data and audio data. FIG. 16 is a data sequence diagram illustrating operation of transmitting a data ID. The following describes the case where the communication terminal 10 starts communication with the counterpart communication terminal 70. Further, in this example, the communication terminal 10aa having the terminal ID "10aa" is used as the communication terminal 10, and the communication terminal 70db having the terminal ID "07db" is used as the communication terminal 70.

As the user "a" selects a desired counterpart communication terminal from the contact list of FIG. 14, the acceptor 12 receives such selection. The transmitter/receiver 11 transmits a communication start request to the communication management system 50. Specifically, the transmitter/receiver 11 transmits a communication start request to the communication management system 50 through the communication network 2 (S121). The communication start request includes the terminal ID "01aa" of the starting terminal 10aa, and the terminal ID "07db" of the counterpart terminal 70db. The transmitter/receiver 51 of the management system 50 receives the communication start request.

On the basis of the terminal ID "01aa" of the starting terminal 10aa and the terminal ID ("07db") of the counterpart terminal 70db, which are included in the communication start request, the memory control 59 of the communication management system 50 changes the operating state field of each of records including the above-mentioned terminal IDs "01aa" and "07db" to "communicating" in the terminal management table (FIG. 10) (S122). In this state, although the starting terminal 10aa and the counterpart terminal 70db have not started communicating, these terminals enter a communicating state, and, if another terminal 10 tries to communicate with the starting terminal 10aa or the counterpart terminal 70db, a notification sound or display that indicates that the terminal is communicating is output.

Next, the memory control 59 of the communication management system 50 searches the terminal management table (FIG. 10) using the terminal ID "01aa" of the starting terminal 10aa and the terminal ID "07db" of the counterpart terminal 70db, received at S121, as search keys, to read corresponding IP addresses (S123).

The transmitter/receiver 51 of the management system 50 transmits the communication start request to the IP address of the counterpart terminal 70db, which is read at S123 (S124). The communication start request includes the terminal IDs "01aa" and "07db", as received at S121. The transmitter/receiver 71 of the counterpart terminal 70db receives the communication start request.

The transmitter/receiver 71 of the counterpart terminal 70*db* transmits a response to the communication start request, to the communication management system 50 (S125). The transmitter/receiver 51 of the management system 50 receives the response to the communication start request. The communication start request indicates whether to accept or reject communication. The example case of accepting the communication start request is described.

The transmitter/receiver 51 of the management system 50 transmits a relay start request indicating a request for starting relaying to the relay device 30 (S126). The relay start request includes the IP addresses of the starting terminal 10*aa* and the counterpart terminal 70*db* read at S123. The transmitter/receiver 31 of the relay device 30 receives the relay start request.

The transmitter/receiver 51 of the management system 50 transmits the response to the communication start request, which is received at S125, to the starting terminal 10*aa* (S127). As described above, in this example, the transmitter/receiver 11 of the starting terminal 10*aa* receives the response accepting the communication start request.

As described above, the starting terminal 10*aa* and the counterpart terminal 70*db* establish an image data/audio data communication session via the relay device 30 (S128-1, 2) to start videoconference. In this example, the starting terminal 10*aa* establishes the image data/audio data communication session with the other communication terminals 90*b* and 90*c*, as illustrated in FIG. 6, in a substantially similar manner as described above.

Referring to FIG. 16, the generator 33 of the relay device 30 generates a data ID specific to each of the terminals 10 that will start communication in the same session (S141). In this embodiment, the data ID is added to the content data (image data and audio data) when such content data is transmitted from one communication terminal to the other communication terminal. With this data ID, the communication terminal as a transmission destination is able to identify the transmission source that transmits such content data.

Next, the memory control 39 of the relay device 30 stores the data ID generated at the generator 33 for each communication terminal, and the IP address of each communication terminal received at S126, in association with each other in the data management table (FIG. 8) (S142). For example, when a data ID "s1d1" is generated for the communication terminal 10, the data ID "s1d1" is stored in association with the IP address "1.2.1.3" of the communication terminal 10. The IP address may be sent with the data, such that the relay device 30 is able to receive the data ID and the IP address from a source of the terminal that sends data.

The transmitter/receiver 31 of the relay device 30 transmits a set of the data ID and the IP address for each communication terminal communicating in the same session, which are associated at S142, to the communication management system 50 (S143). The transmitter/receiver 51 of the management system 50 receives the set of the data ID and the IP address for each communication terminal.

Next, the memory control 59 of the communication management system 50 searches the terminal management table (FIG. 10) using the IP address received at S143 as a search key to obtain the terminal ID and the (counterpart) terminal name associated with the IP address (S144). The transmitter/receiver 51 transmits a set of the data ID, the terminal ID, and the terminal name for each communication terminal in the same session, to the communication terminal 10*aa* (S145-1). The transmitter/receiver 11 of the communication terminal 10*aa* receives the set of the data ID, the terminal ID, and the terminal name for each communication terminal. Similarly, the transmitter/receiver 51 transmits a set of the data ID, the terminal ID, and the terminal name for each communication terminal in the same session, to the communication terminal 70*db* (S145-2). The transmitter/receiver 71 of the communication terminal 71*db* receives the set of the data ID, the terminal ID, and the terminal name for each communication terminal.

Figure 17A:
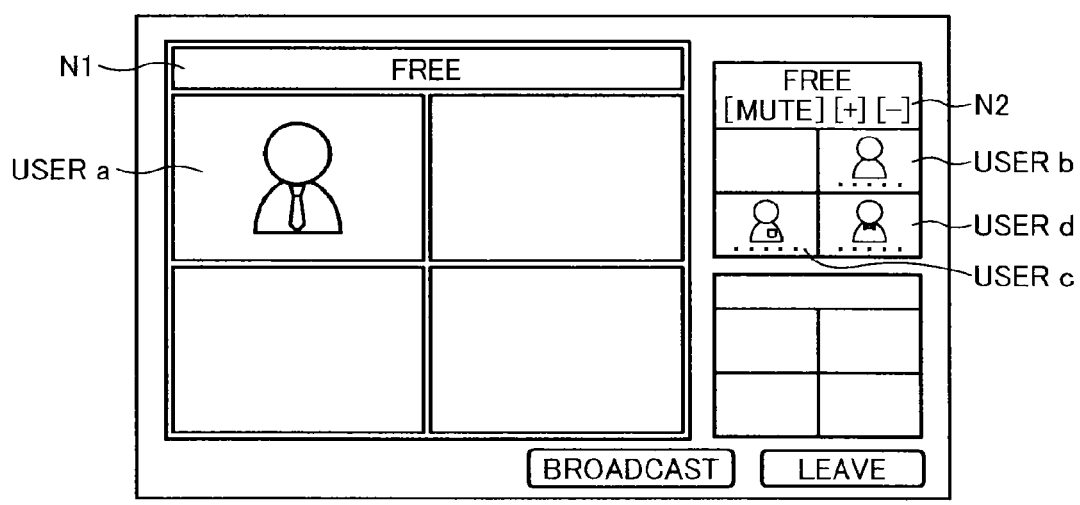
FIGS. 17A and 17B (FIG. 17) are example screens to be displayed at the communication terminal of the communication system of FIG. 1.
Figure 17B:
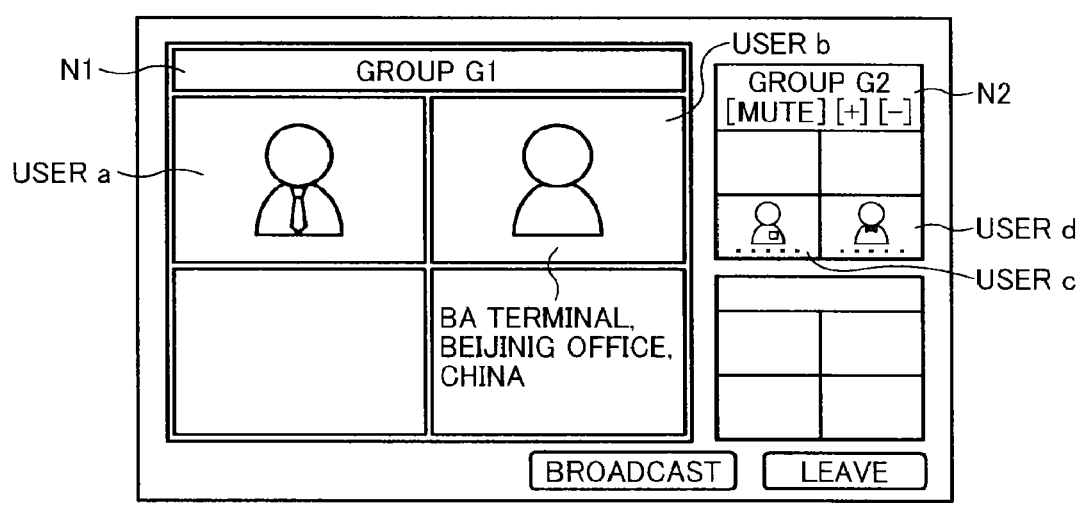

Referring now to FIGS. 17 to 18, operation of creating a group of the user "a" and the user "b", while having a videoconference by the communication terminals 10, 70, 90*b*, and 90*d* through the session, is described according to an embodiment of the present invention. FIGS. 17A and 17B (FIG. 17) are example screens to be displayed at the communication terminal 10 operated by the user "a". FIG. 18 is a data sequence diagram illustrating operation of generating a new group within the same session.

As illustrated in FIG. 17A, the communication terminals 10, 70, 90*b*, and 90*c* respectively operated by the user "a", "d", "b", and "c" are communicating in the same communication session, and all of the communication terminals do not belong to any group (called "free state"). In the screen of FIG. 17A, which is displayed at the communication terminal 10, an image of the user "a" captured at the terminal 10 is displayed in large size at left. On the top of the screen, a group name display area N1 for displaying a name of the group of the user "a" is displayed. Further, the image of the user "a" at the terminal 10 displays, at a lower side, a terminal name of the communication terminal 10 operated by the user "a" or any other information indicating the user "a". On the right of the screen, images of the other users "b" "c" and "d" captured at the other terminals are displayed in small size, with a group name display area N2 for displaying a name of the group of the other users. In the example case illustrated in FIG. 17A, all communication terminals (all users) are in the free state. Further, the image of each user displays, at a lower side, a terminal name of the communication terminal operated by such user or any other information indicating the specific user. With this information, the user at the communication terminal 10 is able to know, from which terminal, the image has been received.

The group name display area N2 includes a [mute] key, a [+] key, and a [−] key. The [mute] key, when selected, turns off sounds transmitted from the communication terminal belonging to the group with the name being displayed in the group name display area N2. The [+] key, when selected, increases a volume of sounds transmitted from the communication terminal belonging to the group with the name being displayed in the group name display area N2. The [−] key, when selected, reduces a volume of sounds transmitted from the communication terminal belonging to the group with the name being displayed in the group name display area N2.

The screen of FIG. 17A further includes a [Broadcast] key at nearly the center of a lower part, and a [Leave] key at nearly the right of the lower part. The [Broadcast] key, when selected, causes the local communication terminal to transmit an image and a sound captured at the local communication terminal to the other communication terminal belonging to any group in the same communication session. The [Leave] key, when selected, causes the local communication terminal to leave from the group that the local communication terminal is belonging to. If the communication terminal is in the free state, the communication terminal remains as it is, even with selection of the [Leave] key.

In FIG. 17A, the screen is divided into a large display area for displaying the user "a", and a small display area for displaying the users "b", "c", and "d". However, the screen may have appearance other than the screen of FIG. 17A. For example, the screen may display all of the users "a" "b" "c" and "d" in the same display area as having a free state. Alternatively, the screen may display the users "a" "b" "c" and "d", respectively, in the individual small-size display areas as having a free state.

Assuming that the user "a" wants to create a group with the user "b", the user "a" selects the display area showing the user "b" in the screen of FIG. 17A. Referring to FIG. 18, in response to selection of the display area of the user "b", the acceptor 12 of the communication terminal 10 receives a request for creating a group with the user "b" (S201). The transmitter/receiver 11 transmits a group creation request to the communication management system 50 (S202). The group creation request includes the terminal ID "01aa" of the communication terminal 10 that sends the request ("request sender terminal"), and the terminal ID "01ba" of the communication terminal 90b that is selected ("request destination terminal"). The transmitter/receiver 51 of the management system 50 receives the group creation request.

Next, the generator 53 of the communication management system 50 generates a group ID for identifying a new group (S203). The memory control 59 stores the group ID created at S203 in the group management table (FIG. 12), in association with the terminal ID "01aa" of the request sender terminal 10 (S204). Similarly, the group ID is stored in association with the terminal ID "01ba" of the request destination terminal 90b. More specifically, assuming that the group ID "gr1" is created, the group management table of FIG. 12 stores the terminal ID "01aa" and the group ID "gr1" in association, and the terminal ID "01ba" and the group ID "gr1" in association. The transmitter/receiver 51 transmits update information indicating updated contents reflecting the change, to each one of the communication terminals 10, 70, 90b, and 90c (S205-1, S205-2, S205-3, S205-4). The communication terminals 10, 70, 90b, and 90c each receive the update information. The update information stores a set of the terminal ID belonging to a new group and the group ID identifying the new group (in this example, "01aa, g1" and "o1ba, g1"). With this update information, each of the communication terminals 10, 70, 90b, and 90c communicating in the same communication session is able to know which communication terminal now belongs to which group.

The display control 14, 74, 94b, and 94c of the communication terminals 10, 70, 90b, and 90c each change a layout of the screen being displayed (S206-1, 2, 3, 4). Further, the communication control 13, 73, 93b, and 93c of the communication terminals 10, 70, 90b, and 90c each adjust a sound being output.

More specifically, for the communication terminal 10 and the communication terminal 90b that are now in the new group, the display control determines that the update information includes its terminal ID associated with the group ID, and updates a screen to additionally display the group name "G1" of the newly created group in the group name display area N1 for the image of the local user, as illustrated in FIG. 17B. The display control of each one of the communication terminal 10 and the communication terminal 90b further updates a screen so as to additionally display an image of the other user belonging to the same group, to be under the group name display area N1 displaying the group name of that same group. For example, in the example case of the terminal 10, the display control 14 extracts a data ID from image data received from the other communication terminal via the relay device 30. The display control 14 refers to a set of data ID and a terminal ID stored in the memory 1000 (at S145-1) to obtain the terminal ID associated with the extracted data ID. The display control 14 further refers to the update information to obtain the terminal ID of the other terminal associated with the group ID "g1" of the group that the local terminal 10 belongs to. The display control 14 determines whether the obtained terminal ID of the terminal that has sent the image data matches the terminal ID of the other terminal in the same group that is included in the update information. When the obtained terminal ID matches the terminal ID of the update information, the display control 14 determines that the image data has been sent from the terminal of the same group, and displays such image to be under the group name display area N1 of the same group.

Still referring to FIG. 17B, the images of the terminals (users) belonging to the same group, which are displayed under the group name display area N1, are displayed in larger size than the images of the other terminals (users) not belonging to the same group. For example, in the example case of the terminal 10, when the display control 14 determines that the obtained terminal ID of the terminal that has sent the image data does not match the terminal ID of the other terminal in the same group, the display control 14 updates a screen so as to display the image on the left. In this example of FIG. 17B, it is assumed that the terminal 90c and the terminal 70 now belong to the same group G2. In such case, the terminal 10 receives update information including a set of terminal ID and group ID "01cb, g2" and "07db, g2" for the new group G2. In such case, the display control 14 updates the group name display area N2 to include the group name G2. Further, in a substantially similar manner as described above for the case of the group G1, the images of the other terminals (users) in the group G2 are displayed under the group name display area N2.

The communication control of each communication terminal further adjusts a volume of sounds for output through the local terminal, based on a data ID extracted from the sound data received from the counterpart communication terminal. More specifically, when audio data is received, the communication control 13 identifies a source of the audio data using a data ID extracted from the received audio data. Based on information indicating which of the terminals belongs to the same group (update information), the communication control 13 controls a volume of sounds to be output based on the received audio data to be larger when the received audio data has been sent from the terminal belonging to the same group, compared to a volume of sounds to be output based on audio data received from the other terminal not belonging to the same group. In this case, if the volume of sounds to be output based on the audio data received from the terminal in the same group has been set at maximum, or relatively high, the communication control 13 does not change the volume of sounds for the terminal in the same group, but changes the volume of sounds for the other terminal not belonging to the same group to be less. Similarly, if the volume of sounds to be output based on the audio data received from the terminal not in the same group has been set at minimum, or relatively low, the communication control 13 does not have to change the volume of sounds for the terminal not in the same group, but changes the volume of sounds for the terminal in the same group to be higher. Alternatively, when setting the volume for the terminal not in the same group, the communication control 13 may set the volume to "0" or "mute", such that no sounds are output from the terminal not in the same group.

For example, at the communication terminal 10, the screen of FIG. 17A is changed to the screen of FIG. 17B.

The screen of FIG. 17B now displays the image of the user "a" and the image of the user "b" in the area for a newly created group G1. The screen of FIG. 17B further displays that the users "c" and "d" now belong to the same group with the name "G2". In this example, the display control 13 of the communication terminal 10 increases a volume of sounds received from the communication terminal 90b, which belongs to the same group G1. The volume of sounds received from the communication terminals 90c and 70 is kept at the same level, such that it is lower than that of the sounds received from the communication terminal 90b. Accordingly, the image of the user at the communication terminal belonging to the same group is displayed in larger size. The sounds of the user at the communication terminal belonging to the same group are output at a higher level.

Figure 19A:
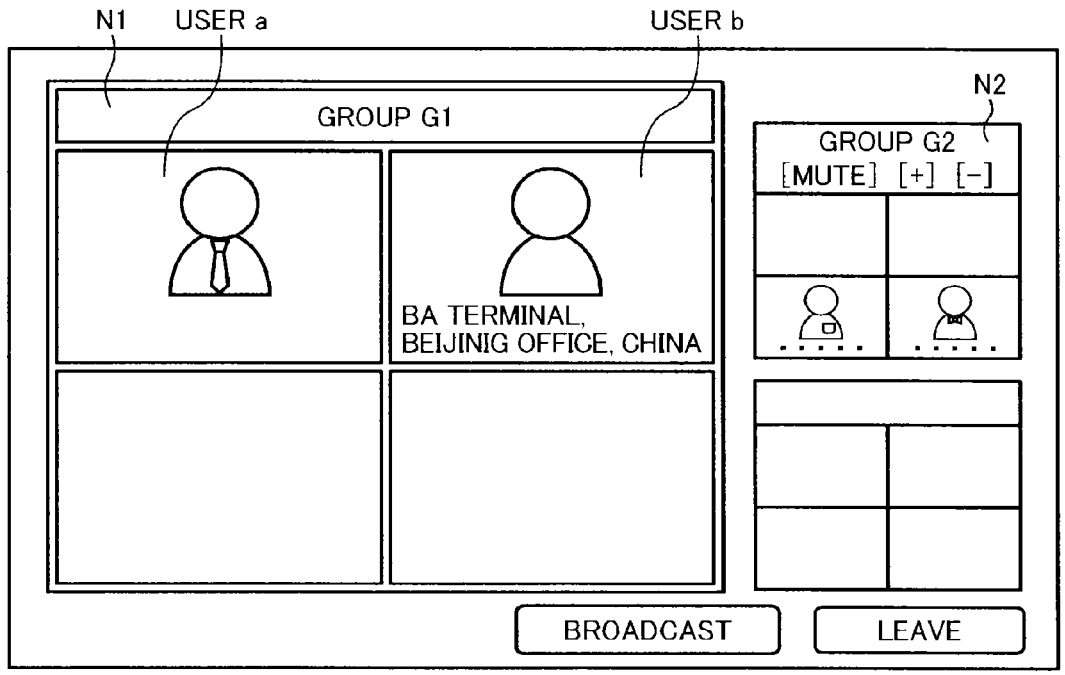
FIGS. 19A and 19B (FIG. 19) are example screens to be displayed at the communication terminal of the communication system of FIG. 1.
Figure 19B:
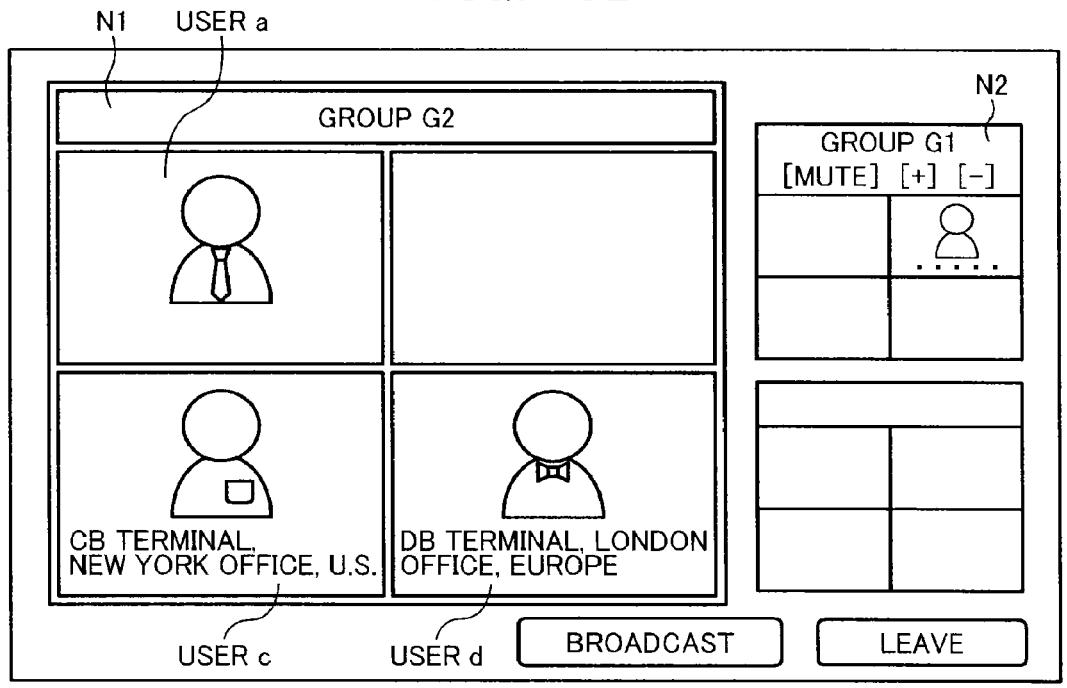

Referring to FIGS. 19 to 20, operation of changing the group is described according to an embodiment of the present invention. FIGS. 19A and 19B (FIG. 19) are example screens to be displayed at the communication terminal 10 operated by the user "a". FIG. 20 is a data sequence diagram illustrating operation of changing a group within the same session, according to an embodiment of the present invention.

The screen of FIG. 19A is the same as the screen of FIG. 17B. It is assumed that the user "a" of the communication terminal 10 wants to change a group that the user "a" belongs to, from the group G1 to the group G2. As the user "a" selects the display area displaying the users "c" and "d", referring to FIG. 20, the acceptor 12 of the communication terminal 10 receives a request for changing the group (S221). The transmitter/receiver 11 transmits a group change request to the communication management system 50 (S222). The group change request includes the terminal ID "01 aa" of the communication terminal 10 that sends the request ("request sender terminal"), and the terminal ID "01cb" of the communication terminal 90 that is selected ("request destination terminal"). In this example, the group change request may further include the terminal ID "07db" of the terminal 70 of the group G2, as the request destination terminal. The transmitter/receiver 51 of the management system 50 receives the group change request.

The memory control 59 accesses the group management table (FIG. 12), to change from the group ID "g1" that is currently associated with the terminal ID "01aa" of the request sender terminal 10, to the group ID "g2" associated with the terminal IDs "01cb" and "07db". The transmitter/receiver 51 transmits update information indicating updated contents reflecting the change, to each one of the communication terminals 10, 70, 90b, and 90c (S224-1, S224-2, S224-3, S224-4). The communication terminals 10, 70, 90b, and 90c each receive the update information. The display control 14, 74, 94b, and 94c of the communication terminals 10, 70, 90b, and 90c each change a layout of the screen being displayed (S225-1, 2, 3, 4). Further, the communication control 13, 73, 93b, and 93c of the communication terminals 10, 70, 90b, and 90c each adjust a sound being output. For example, at the communication terminal 10, the screen of FIG. 19A is changed to the screen of FIG. 19B. The screen of FIG. 19B now displays the image of the user "a", together with the image of the user "c" and the image of the user "d" in the area for the group G2. The screen of FIG. 19B indicates that the user "b" belongs to the group G1. Alternatively, the user "b" may be in the free state, as only one user is in the group. For example, when the management system 50 determines that only one terminal belongs to one group, the management system 50 may change the group ID of that terminal to the free state "fr".

Figure 21A:
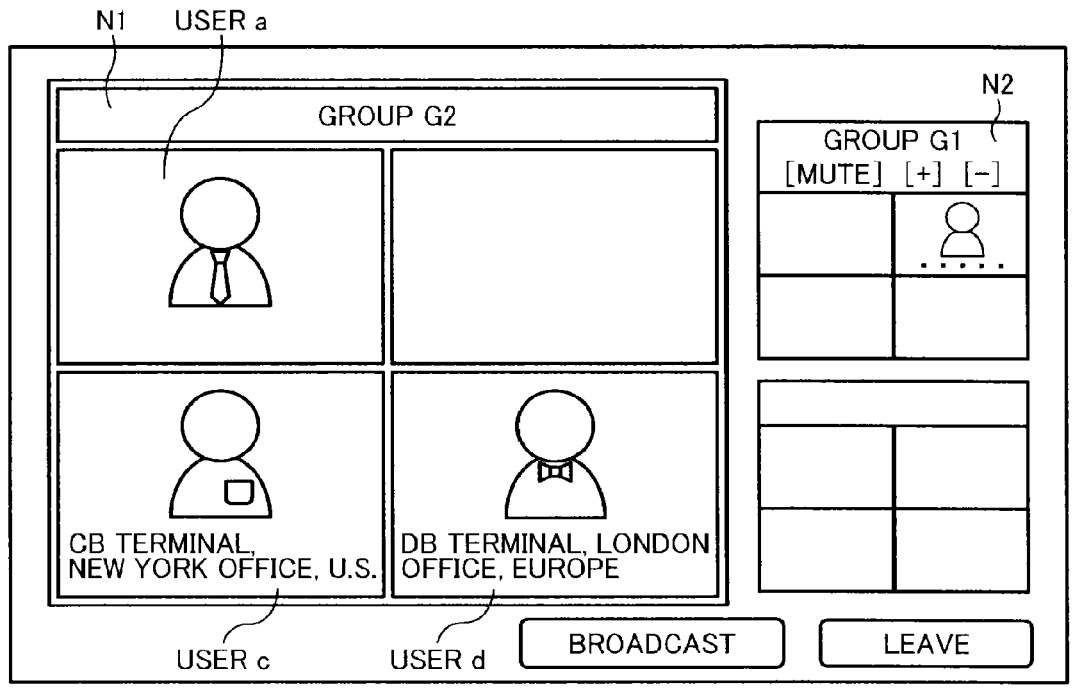
FIGS. 21A and 21B (FIG. 21) are example screens to be displayed at the communication terminal of the communication system of FIG. 1.
Figure 21B:
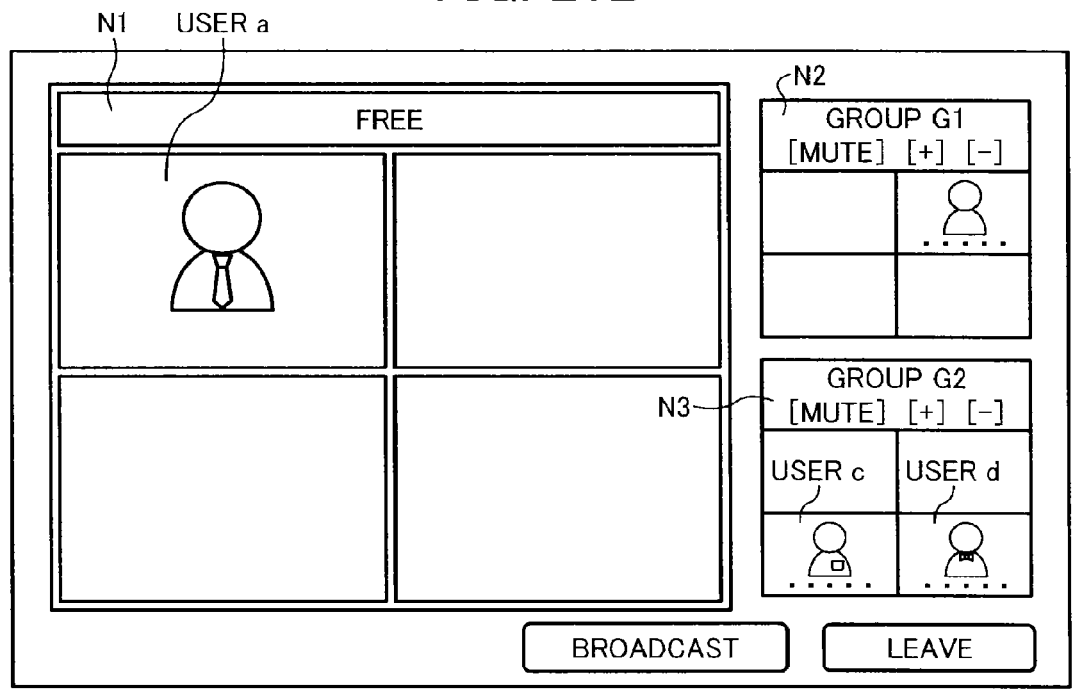

Referring to FIGS. 21 and 22, operation of leaving from the group is described according to an embodiment of the present invention. FIGS. 21A and 21B (FIG. 21) are example screens to be displayed at the communication terminal 10 operated by the user "a". FIG. 22 is a data sequence diagram illustrating operation of leaving from the group.

The screen of FIG. 21A is the same as the screen of FIG. 19B. It is assumed that the user "a" of the communication terminal 10 wants to leave from the group G2. As the user "a" selects the "Leave" key on the lower right of the screen, referring to FIG. 22, the acceptor 12 of the communication terminal 10 receives a request for leaving from the group (S241). In response to the request for leaving from the group, the transmitter/receiver 11 transmits a request for changing to the free state to the communication management system 50 (S242). The free request includes the terminal ID "01aa" of the request sender terminal 10aa. The transmitter/receiver 51 of the management system 50 receives the free request.

The memory control 59 of the communication management system 50 accesses the group management table (FIG. 12) to change the group ID associated with the request sender terminal 10, from the group ID "g2" to the group ID "fr" indicating the free state. The transmitter/receiver 51 transmits update information indicating updated contents reflecting the change, to each one of the communication terminals 10, 70, 90b, and 90c (S244-1, S244-2, S244-3, S244-4). The communication terminals 10, 70, 90b, and 90c each receive the update information. The display control 14, 74, 94b, and 94c of the communication terminals 10, 70, 90b, and 90c each change a layout of the screen being displayed (S245-1, 2, 3, 4). Further, the communication control 13, 73, 93b, and 93c of the communication terminals 10, 70, 90b, and 90c each adjust a sound being output. The changing of the layout and changing of the volume are performed in a substantially similar manner as described above referring to S206-1, 2, 3, 4 of FIG. 18. The screen of FIG. 21A is changed to the screen of FIG. 21B, which indicates that the user "a" is in the free state. The screen of FIG. 21B indicates that the users "c" and "d" belong to the group G2. The screen of FIG. 21B further indicates that the user "b" belongs to the group G1. Alternatively, the screen of FIG. 21B may indicate that the user "b" is in the free state.

Figure 23A:
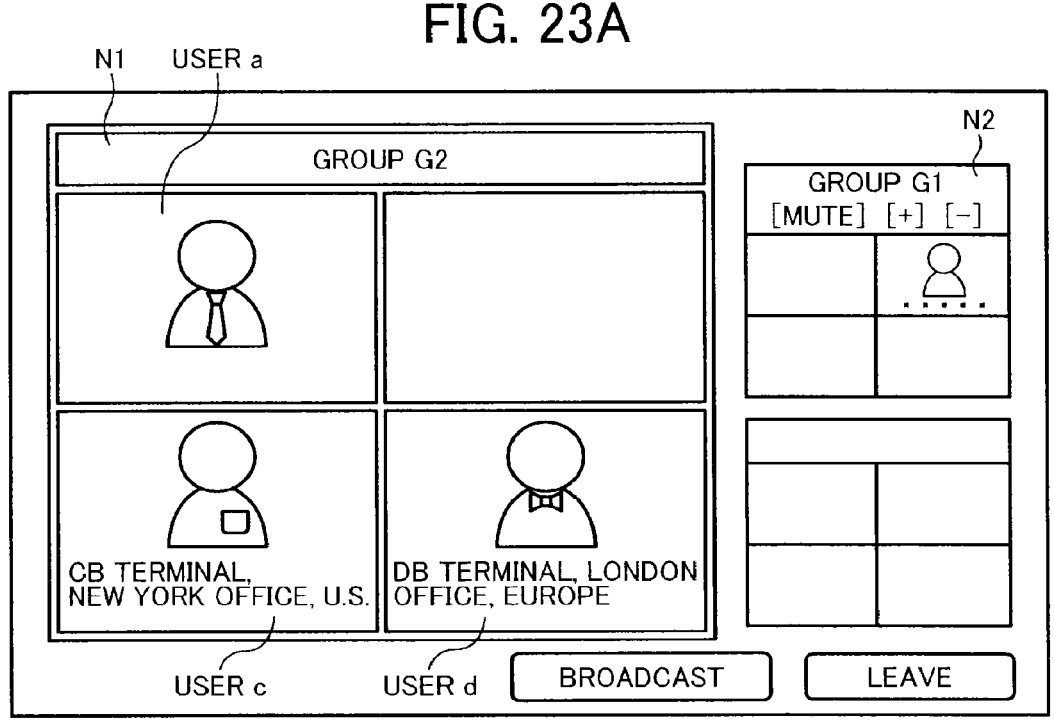
FIGS. 23A and 23B (FIG. 23) are example screens to be displayed at the communication terminal of the communication system of FIG. 1.
Figure 23B:
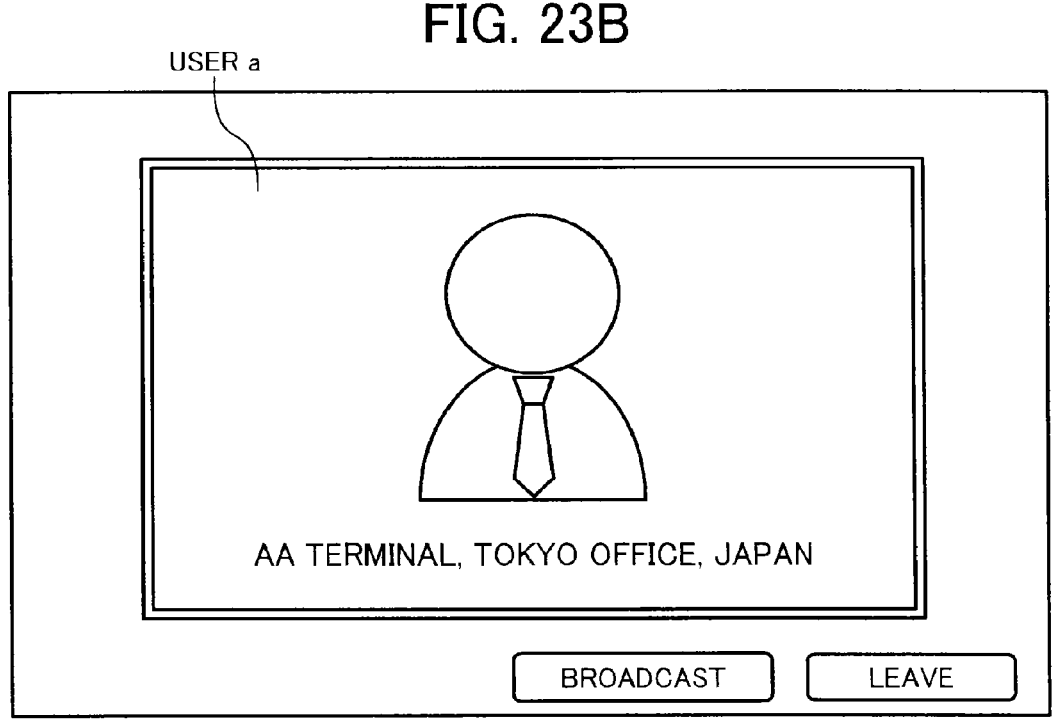
Figure 25:
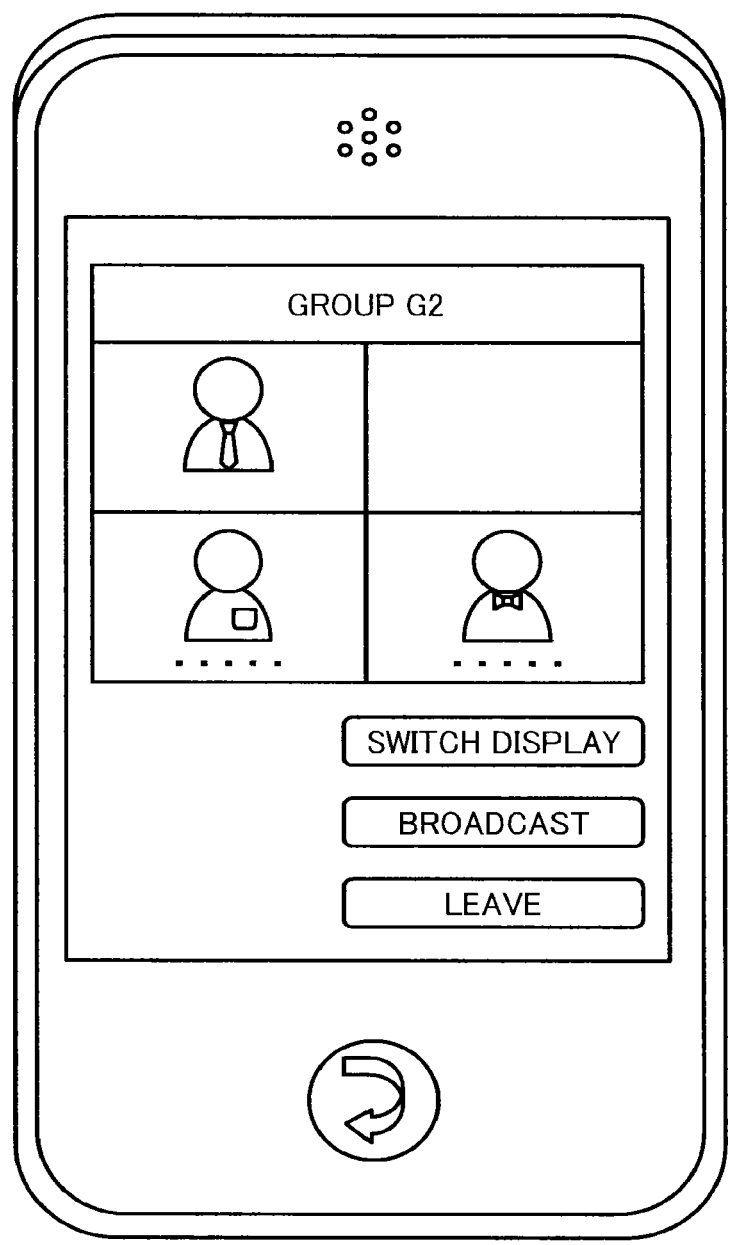
FIG. 25 is an example screen to be displayed at the communication terminal of the communication system of FIG. 1.

Referring now to FIGS. 23 and 24, operation of processing a broadcast request is described according to an embodiment of the present invention. FIGS. 23A and 23B (FIG. 23) are example screens to be displayed at the communication terminal 10 operated by the user "a". FIG. 24 is a data sequence diagram illustrating operation of processing a broadcast request according to the embodiment of the present invention.

The screen of FIG. 23A is the same as the screen of FIG. 21A. It is assumed that the user "a" of the communication terminal 10 wants to transmit image data and/or audio data to all communication terminals communicating in the same session. As the user "a" selects the "Broadcast" key on the lower right of the screen, referring to FIG. 24, the acceptor 12 of the communication terminal 10 receives a broadcast request (S261). The transmitter/receiver 11 transmits a broadcast request to the communication management system 50 (S262). The broadcast request includes the terminal ID "01aa" of the request sender terminal 10aa. The transmitter/receiver 51 of the management system 50 receives the broadcast request.

The memory control 59 of the communication management system 50 accesses the group management table (FIG.

12) to change the group ID associated with the request sender terminal 10, from the group ID "g2" to the group ID "br" indicating the broadcast state. The transmitter/receiver 51 transmits update information indicating updated contents reflecting the change, to each one of the communication terminals 10, 70, 90*b*, and 90*c* (S264-1, S264-2, S264-3, S264-4). The communication terminals 10, 70, 90*b*, and 90*c* each receive the update information. The display control 14, 74, 94*b*, and 94*c* of the communication terminals 10, 70, 90*b*, and 90*c* each change a layout of the screen being displayed (S265-1, 2, 3, 4). Further, the communication control 13, 73, 93*b*, and 93*c* of the communication terminals 10, 70, 90*b*, and 90*c* each adjust a sound being output. The changing of the layout and changing of the volume are performed in a substantially similar manner as described above referring to S206-1, 2, 3, 4 of FIG. 18. However, for each terminal, when a data ID extracted from the received content data corresponds to the terminal ID of the terminal requesting to broadcast (group ID "br"), the display control changes a screen to only display the image data received from such terminal requesting to broadcast. Similarly, the communication control adjusts a volume of sounds to be output based on audio data received from the terminal requesting to broadcast, to be larger than a volume of sounds to be output based on audio data received from the other terminal. Alternatively, the communication control may adjust a volume of sounds of the other terminal to be "0" or "mute", such that only sounds of the terminal requesting to broadcast is output, for example, through the speaker 115.

The screen of FIG. 23B is displayed, at all communication terminals 10, 70, 90*b*, and 90*c* communicating in the communication session. That is, the image data and audio data, transmitted from the communication terminal 10 that send a broadcast request, is displayed. As the user "a" selects the "Broadcast" key again, the terminal 10 is changed from the broadcast state, back to the normal operating mode in which the communication terminal 10 communicates in the group G2 as illustrated in FIG. 23A.

In the above-described embodiment, as illustrated in FIG. 17A, each communication terminal displays an image from the other communication terminal belonging to the same group in larger size, while displaying an image from the other communication terminal belonging to the other group in smaller size. The screen at each terminal may be displayed in any other ways. For example, in case of the communication terminal 90, that is, the smart phone having relatively small display size, the communication terminal may display only an image from the other communication terminal belonging to the same group, with a key for allowing the user to switch to another screen that displays an image from the other communication terminal belonging to the different group.

More specifically, when the communication terminal 90 determines that the received image data is transmitted from the terminal belonging to the same group to which the communication terminal 90 belongs, the display control 94 displays an image of the received image data on a screen. On the other hand, when the communication terminal 90 determines that the received image data is transmitted from the terminal not in the same group, the display control 94 does not display an image of the received image data on the screen. According to a user instruction for switching, the communication terminal 90 displays the image of the received image data that is received from the terminal not in the same group, on the screen.

As described above referring to some embodiments, the communication terminals belonging to the same group display images received from the terminals in the same group in larger size, compared to images received from the terminals not in the same group. Similarly, the communication terminals belonging to the same group output sounds received from the terminals in the same group at larger volume, compared to sounds received from the terminals not in the same group. Accordingly, even when the communication terminals are communicating in the same communication session, the user at each communication terminal is able to freely create a group within the same communication session, to privately communicate within the same group. That is, the communication terminal is able to change a priority in outputting content data, depending on whether or not a terminal sending content data belongs to the same group.

In the above-described embodiment, the communication terminal (10, 70) provides the terminal identification information to the mobile terminal 90 by near-distance wireless communication, the communication terminal may provide using any other communication network such as by a USB cable. In addition, although the case of a videoconference terminal has been described as an example of a communication terminal in the above-described embodiment, the embodiment is not limited to this case, and the communication system 1 may be a phone system such as an IP phone system or an Internet phone system. In addition, a smart phone, a smart watch, a mobile phone, a car navigation terminal, a wearable computer, a monitoring camera, a digital camera communicable using WiFi, any communication device (a projector, a game machine), a digital signage, or industrial equipment with a communication function may be used. A wearable computer includes a watch and a head-mounted display. Industrial equipment includes office equipment such as a multifunction peripheral (MFP)/printer/product, medical equipment such as an endoscope and a Computed Tomography (CT) scan, and agricultural equipment such as a cultivator.

In addition, although image data and audio data are described as examples of content data in the above-described embodiment, the content data is not limited to these items of data, and the content data may be touch data. In this case, a feeling obtained by a user's contact at one terminal side is transmitted to the other terminal side. Further, the content data may be smell data. In this case, a smell at one terminal side is transmitted to the other terminal side. In addition, the content data may be at least one of image data, audio data, touch data, and smell data.

In addition, although the case in which a videoconference is held by the communication system 1 has been described in the above-described embodiment, the embodiment is not limited to this case. The communication system 1 may be used in meetings, general conversation between family members or friends, or one-way presentation of information.

In the above-described embodiment, the recording request or the reading request is transmitted or received by near-distance wireless communication. Alternatively, such request may be transmitted or received by ultrasonic communication.

Although the case of a videoconference terminal has been described as an example of a communication terminal in the above-described embodiment, the embodiment is not limited to this case, and the communication system 1 may be a phone system such as an IP phone system or an Internet phone system. In addition, a smart phone, a smart watch, a mobile phone, a car navigation terminal, a wearable computer, a monitoring camera, a digital camera communicable using WiFi, any communication device (a projector, a game machine), a digital signage, or industrial equipment with a communication function may be used. A wearable computer includes a watch and a head-mounted display. Industrial equipment includes office equipment such as a multifunction peripheral (MFP)/printer/product, medical equipment such as an endoscope, a Computed Tomography (CT) scan, and radiotherapy equipment, and agricultural equipment such as a cultivator.

In addition, although image data and audio data are described as examples of content data in the above-described embodiment, the content data is not limited to these items of data, and the content data may be touch data. In this case, a feeling obtained by a user's contact at one terminal side is transmitted to the other terminal side. Further, the content data may be smell data. In this case, a smell at one terminal side is transmitted to the other terminal side. In addition, the content data may be at least one of image data, audio data, touch data, and smell data.

In addition, although the case in which a videoconference is held by the communication system 1 has been described in the above-described embodiment, the embodiment is not limited to this case. The communication system 1 may be used in meetings, general conversation between family members or friends, or one-way presentation of information.

In case the communication terminal 70 is implemented as the electronic whiteboard, because of its relatively large size, the functions of the communication management system 50 and/or the relay device 30 may be incorporated in the communication terminal 70. In such case, the terminal at the site A and the terminal at the site D can be communicated via the Intranet, configuring the on-premises system. This improves a level of security.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A communication management system configured to manage a plurality of communication terminals communicating in a same communication session, the system comprising:
   a receiver to receive, from a first communication terminal, a group creation request for creating, while maintaining the same communication session, a first group with a second communication terminal, the group creation request including first terminal identification information identifying the first communication terminal and second terminal identification information identifying the second communication terminal, the first communication terminal and the second communication terminal each being one of the plurality of communication terminals communicating in the same communication session;
   circuitry to generate first group identification information identifying the first group and store group information in a memory, the group information associating the first group identification information with the first terminal identification information and the second terminal identification information; and
   a transmitter to transmit the group information to each of respective ones of the plurality of communication terminals communicating in the same communication session, wherein
   the receiver further receives, from the first communication terminal, a group change request for changing a group to which the first communication terminal belongs from the first group to a second group,
   the circuitry updates the group information in the memory so as to change the first group identification information associated with the first terminal identification information to second group identification information identifying the second group, and
   the transmitter transmits the updated group information, including the second group identification information and identifiers of all communication terminals in the second group, to each of respective ones of the plurality of communication terminals communicating in the same communication session.

2. The communication management system of claim 1, wherein
   the receiver further receives, from the first communication terminal, a request for changing to a free state in which the first communication terminal does not belong to any group,
   the circuitry updates the group information in the memory so as to change the first group identification information associated with the first terminal identification information, to free state information indicating that the first communication terminal does not belong to any group, and
   the transmitter transmits the updated group information to the respective ones of the plurality of communication terminals communicating in the same communication session.

3. The communication management system of claim 1, wherein
   the receiver further receives, from the first communication terminal, a request for changing to a broadcast state in which content data transmitted from the first communication terminal is output in higher priority than content data transmitted from other communication terminal,
   the circuitry updates the group information in the memory so as to change the first group identification information associated with the first terminal identification information, to the broadcast state information indicating the broadcast state in which content data transmitted from the first communication terminal is output in higher priority, and
   the transmitter transmits the updated group information to the respective ones of the plurality of communication terminals communicating in the same communication session.

4. A communication system, comprising:
the communication management system of claim 1; and
the plurality of communication terminals, which are communicating in the same communication session, each communication terminal including:
   a receiver to receive content data from another communication terminal; and circuitry to determine whether the another communication terminal belongs to the same group based on the group information received from the communication management system to generate a determination result, and control an output device to output the received content data differently based on the determination result.

5. The communication system of claim 4, further comprising:
a relay device to relay content data among the plurality of communication terminals in the same communication session.

6. A method of managing a plurality of communication terminals communicating in a same communication session, the method comprising:
receiving, from a first communication terminal, a group creation request for creating a first group, while maintaining the same communication session, with a second communication terminal, the group creation request including first terminal identification information identifying the first communication terminal and second terminal identification information identifying the second communication terminal, the first communication terminal and the second communication terminal each being one of the plurality of communication terminals communicating in the same communication session;
generating first group identification information identifying the first group;
storing group information in a memory, the group information associating the first group identification information with the first terminal identification information and the second terminal identification information;
transmitting the group information to each of respective ones of the plurality of communication terminals communicating in the same communication session,
receiving, from the first communication terminal, a group change request for changing a group to which the first communication terminal belongs from the first group to a second group;
updating the group information in the memory so as to change the first group identification information associated with the first terminal identification information to second group identification information identifying the second group; and
transmitting the updated group information, including the second group identification information and identifiers of all communication terminals in the second group, to each of respective one of the plurality of communication terminals communicating in the same communication session.

7. The method of claim 6, further comprising:
receiving, from the first communication terminal, a request for changing to a free state in which the first communication terminal does not belong to any group;
updating the group information in the memory so as to change the first group identification information associated with the first terminal identification information, to free state information indicating that the communication terminal does not belong to any group; and
transmitting the updated group information to the respective ones of the plurality of communication terminals communicating in the same communication session.

8. The method of claim 6, further comprising:
receiving, from the first communication terminal, a request for changing to a broadcast state in which content data transmitted from the first communication terminal is output in higher priority than content data transmitted from other communication terminal;
updating the group information in the memory so as to change the first group identification information associated with the first terminal identification information, to the broadcast state information indicating the broadcast state in which content data transmitted from the first communication terminal is output in higher priority; and
transmitting the updated group information to the respective ones of the plurality of communication terminals communicating in the same communication session.

9. A method of controlling output of content data, the method comprising:
transmitting, from a first communication terminal to a communication management system, a group creation request for creating, while maintaining a same communication session with a plurality of communication terminals, a first group with a second communication terminal, the group creation request including first terminal identification information identifying the first communication terminal and second terminal identification information identifying the second communication terminal, the first communication terminal and the second communication terminal each being one of the plurality of communication terminals communicating in the same communication session;
receiving, from the communication management system, group information associating first group identification information identifying the first group, with the first terminal identification information and the second terminal identification information;
controlling an output device to output content data received from the second communication terminal belonging to the first group in greater size or volume, compared to content data received from another communication terminal not belonging to the first group;
transmitting, from the first communication terminal to the communication management system, a group change request for changing a group to which the first communication terminal belongs from the first group to a second group, the second group not including the second communication terminal;
receiving, from the communication management system, updated group information associating second group identification information identifying the second group, with the first terminal identification information, the updated group information including the second group identification information and identifiers of all communication terminals in the second group; and
controlling an output device to output content data received from the second communication terminal belonging to the first group in less size or volume, compared to content data received from another communication terminal belonging to the second group.

10. The method of claim 9, further comprising:
transmitting, from the first communication terminal to the communication management system, a request for changing to a free state in which the first communication terminal does not belong to any group;
receiving, from the communication management system, updated group information associating free state information indicating the free state, with the first terminal identification information; and
controlling an output device to output an image reflecting that the first communication terminal is in the free state.

11. The method of claim 9, further comprising:
transmitting, from the first communication terminal to the communication management system, a request for changing to a broadcast state in which content data transmitted from the first communication terminal is output in higher priority than content data transmitted from other communication terminals;
receiving, from the communication management system, updated group information associating broadcast state information indicating the broadcast state, with the first terminal identification information; and
controlling an output device to output content data generated at the communication terminal in higher priority than content data transmitted from the other communication terminals.

* * * * *